United States Patent [19]

Yoshiaki

[11] Patent Number: 5,500,507
[45] Date of Patent: Mar. 19, 1996

[54] LASER BEAM MACHINING DEVICE AND LASER BEAM MACHINING METHOD

[75] Inventor: Banzawa Yoshiaki, Toyama, Japan

[73] Assignee: Nippei Toyama Corporation, Tokyo, Japan

[21] Appl. No.: 66,154

[22] PCT Filed: Sep. 30, 1992

[86] PCT No.: PCT/JP92/01256

§ 371 Date: Oct. 18, 1993

§ 102(e) Date: Oct. 18, 1993

[87] PCT Pub. No.: WO93/06963

PCT Pub. Date: Apr. 15, 1993

[30] Foreign Application Priority Data

Sep. 30, 1991 [JP] Japan .................................. 3-252529
Jun. 30, 1992 [JP] Japan .................................. 4-173289

[51] Int. Cl.⁶ ........................................... B23K 26/02
[52] U.S. Cl. ............................ 219/121.82; 219/121.67
[58] Field of Search ................... 219/121.82, 121.67, 219/121.7, 121.85

[56] References Cited

U.S. PATENT DOCUMENTS 5,185,510  2/1993  Zumstein .................... 219/121.82
5,192,848  3/1993  Miyakawa et al. .......... 219/121.82
5,229,571  7/1993  Neiheisel .................... 219/121.82

FOREIGN PATENT DOCUMENTS 3624 415    1/1987   Germany
60-30596    2/1985   Japan .
60-247422  12/1985   Japan .
62-8957     3/1987   Japan .

*Primary Examiner*—Clifford C. Shaw
*Attorney, Agent, or Firm*—Watts, Hoffmann, Fisher & Heinke Co.

[57] ABSTRACT

A laser beam machining device, which can automatically machine a plurality of workpieces in sequence, is disclosed. A plurality of pallets supporting workpieces are stored in a pallet storing station in a shelved manner by means of a pallet transport device. A pallet drawn out from the pallet storing station by means of a pallet transport device is transported into the laser beam machine. After laser beam machining is done, the pallet supporting the machined workpiece is stored in a predetermined location in the pallet storing station by means of the pallet transport device.

15 Claims, 37 Drawing Sheets

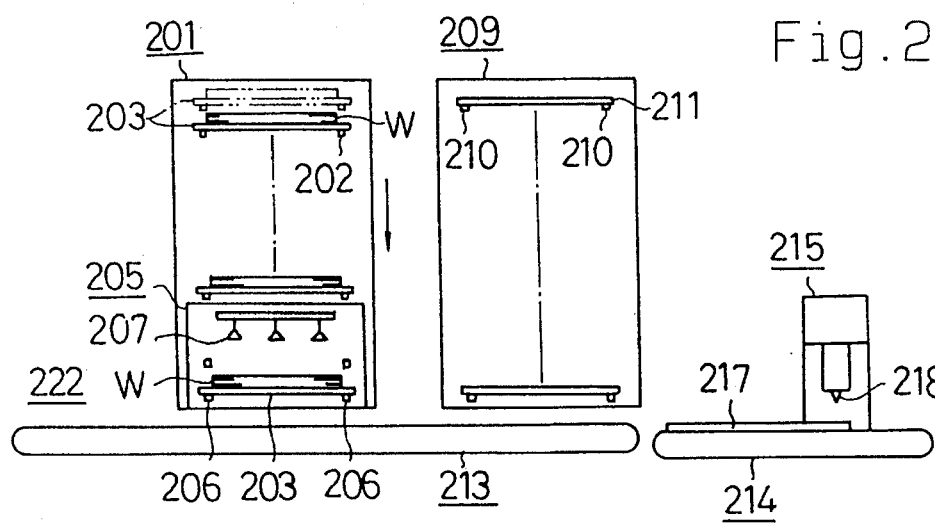
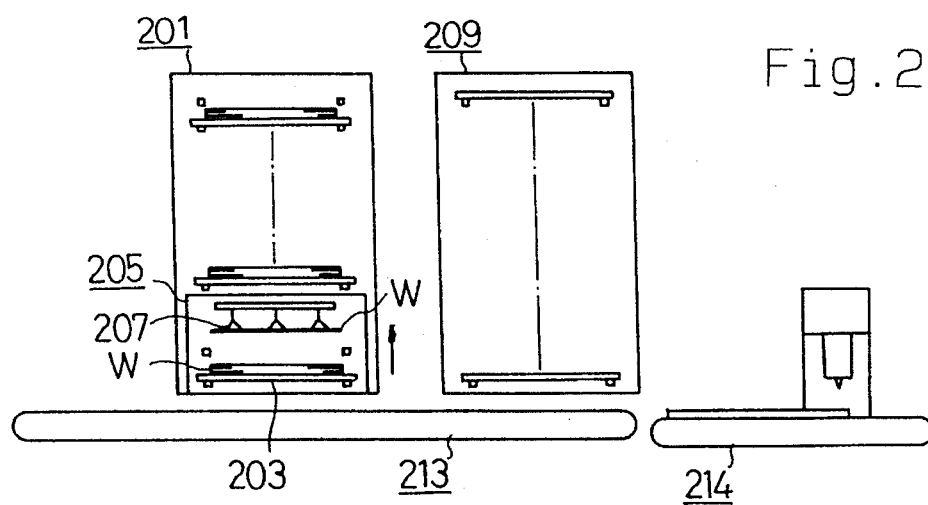
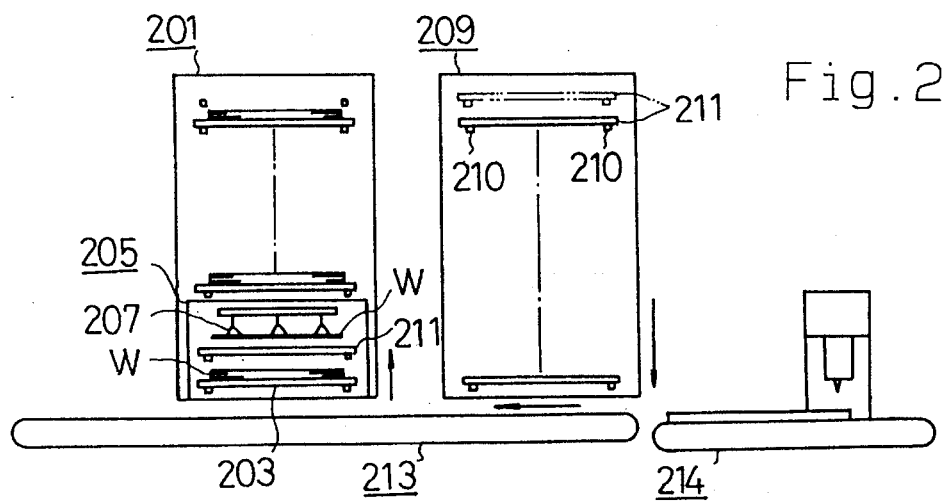

LASER BEAM MACHINING DEVICE AND LASER BEAM MACHINING METHOD

TECHNICAL FIELD

The present invention relates to a laser beam machining device, which irradiates a laser beam to a work piece to perform a cutting operation and a laser beam machining method.

BACKGROUND ART

Japanese Examined Utility Model Publication 62-8957 and Japanese Unexamined Patent Publication 60-30596 disclose a laser beam machining device of this type, which transports a workpiece to a working position where laser beam machining is carried out.

The workpiece transport device disclosed in Japanese Examined Utility Model Publication No. 62-8957 includes an intermediate conveyer, in which an upper transport passage and a lower transport passage are opposed to a laser beam machine. A transport-in conveyer is located at a first side of the intermediate conveyer. The transport-in conveyer vertically moves between positions corresponding to the upper transport passage and the lower transport passage. A transport-out conveyer is located at a second side of the intermediate conveyer. The transport-out conveyer vertically moves between positions corresponding to the upper transport passage and the lower transport passage.

When the transport-in and the transport-out conveyers are placed at a position corresponding to the upper transport passage, and when a pallet carrying a workpiece is placed on the transport-in conveyer, the pallet is transported into the upper passage of the intermediate conveyer from the transport-in conveyer. The workpiece is machined by means of the laser beam machine, and simultaneously, the pallet carrying the machined workpiece is transported onto the transport-out conveyer from the upper transport passage of the intermediate conveyer. Further, after the machined workpiece is removed from the pallet, the transport-in and transport-out conveyers are lowered to the position corresponding to the lower transport passage. With both conveyers in this position, the empty pallet is transported back to the transport-in conveyer from the transport-out conveyer via the lower transport passage of the intermediate conveyer.

A workpiece transport device disclosed in Japanese Unexamined Patent Publication No. 60-30596 includes a work station for the laser beam machine. A first setting station for attaching a workpiece on a pallet is provided at a first side thereof. A second setting station for removing the workpiece from the pallet is provided at a second side thereof. A conveyer for returning the pallet is provided between the first and second stations, detouring around the work station.

After a workpiece is mounted on the pallet at the first station, the pallet is transported to the work station from the first station. The workpiece is cut by the machine and, simultaneously, the pallet carrying the machined workpiece is transported to the second station from the work station. Further, at the second station, after the machined workpiece is removed from the pallet, the empty pallet is transported back to the first station from the second station by means of the conveyer that makes a detour around the work station.

These conventional devices have their first and second stations spaced at opposite sides of the work station. This arrangement precludes the possibility of attaching and removing a workpiece at a single station. Therefore, it is difficult to automate the workpiece attaching and removing operations in order to achieve unmanned operation.

Furthermore, in other conventional devices, each workpiece should be chucked before the workpiece is transported into the work station. In this situation, each workpiece is stamped by the laser beam at the machining position. A micro-joint method is used to prevent the stamped portions from falling. Therefore, the connecting portion of the workpiece treated by the micro-joint method should be broken off with a hammer. The broken-off portion of the workpiece must be ground for finishing. Thus, the process is extremely troublesome.

SUMMARY OF THE INVENTION

Accordingly, an object of the present invention is to provide a laser beam machining device and a laser beam machining method that permits mounting and removal of a workpiece at a single place.

Another object of the present invention is to provide a laser beam machining device and a laser beam machining method, which can store a plurality of pallets carrying workpieces into a stocker having multiple stages. By automating the pallet transporting operation, the workpieces within the stocker can be machined in an unmanned operation. Therefore, continuous machining is achieved.

A further object of the present invention is to provide a laser beam machining device and a laser beam machining method that do not require any additional or special treatment to the machined workpiece.

The present invention achieves the foregoing objectives by providing a laser beam machining device having a stocker for storing a plurality of pallets in a shelved manner. Each of the pallets securely carries a single workpiece. The pallets are transferred to and machined by a laser processing machine, one by one. The laser beam machining apparatus includes a pallet handling device for selectively drawing a pallet out of the stocker and replacing a pallet into the stocker. Also included is an intermediate transport station located between the stocker and the laser processing machine. The intermediate transport station selectively receives pallets drawn out of the stocker and supplies the pallets to the laser processing machine. Also included is a transfer device for automatically transferring pallets from predetermined positions in the stocker to the laser machine via the intermediate transfer station before the workpiece is machined and from the laser machine to the intermediate transfer station after the workpiece is machined. The workpiece is kept free from direct contact with the transfer device.

Also, the invention includes a method of laser beam machining workpieces with a laser processing machine. The workpieces are carried on pallets which are held by shelves in a stocker. The method includes steps of: drawing one of the pallets out of the stocker with a workpiece handling device to an intermediate station; transferring the withdrawn pallet from the intermediate station to a laser processing station with a transferring device; machining the workpiece carried on the pallet with the laser machining machine at the laser processing station; transferring the pallet from the laser processing station back to the intermediate station with the transferring device; and replacing the pallet in a predetermined position in the stocker. Each step is performed while maintaining the workpiece free from direct contact with the transferring device and the handling device.

BRIEF DESCRIPTION OF DRAWINGS

FIGS. 29(a) through 29(c) are explanatory diagrams showing the operational sequence for a workpiece according to the second embodiment;

DESCRIPTION OF THE PREFERRED EMBODIMENTS

The first embodiment of a laser beam machining device according to the present invention will now be described referring to FIGS. 1 through 29.

Figure 1:
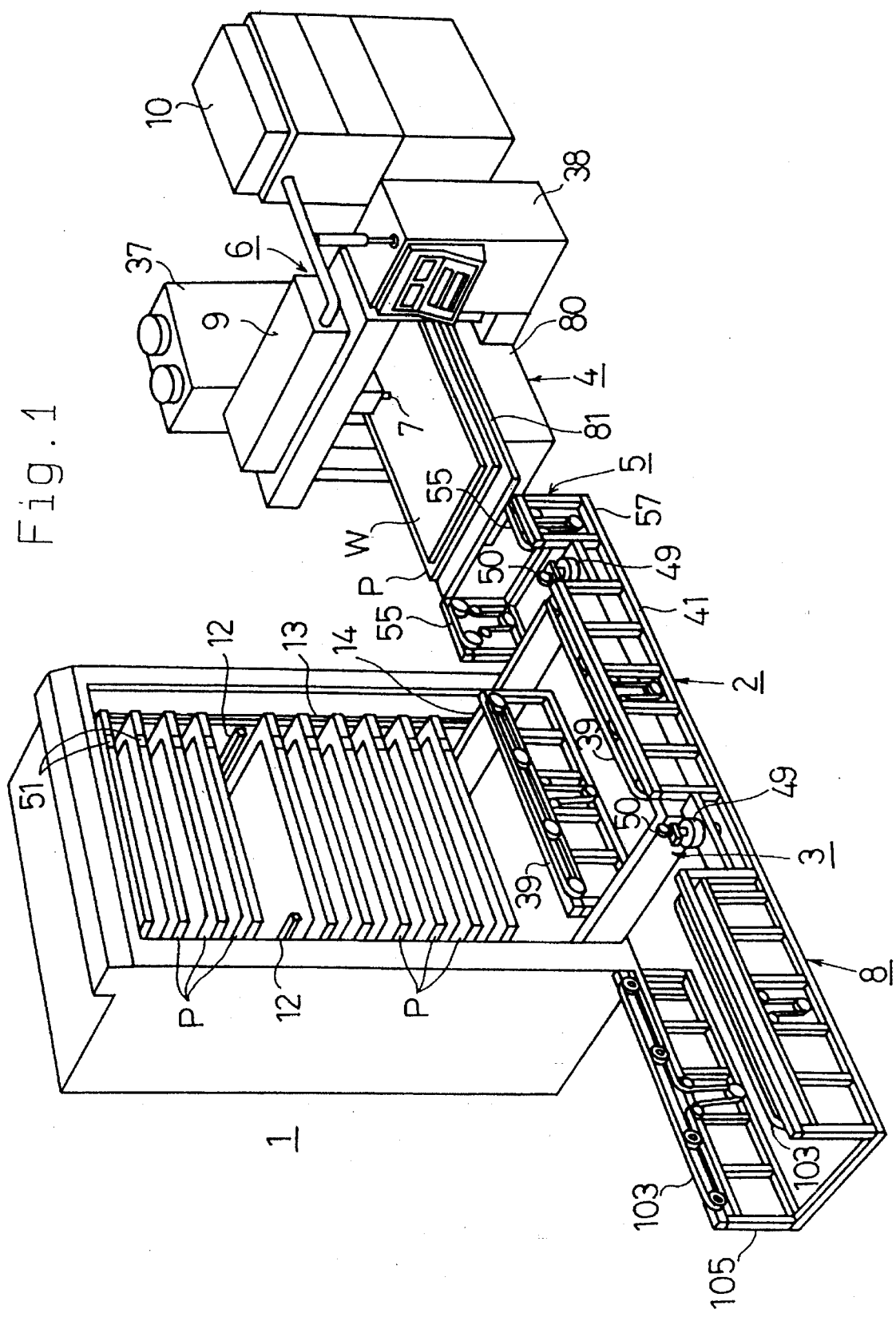
FIG. 1 is a perspective view of a laser beam machining device according to a first embodiment of the present invention.
Figure 2:
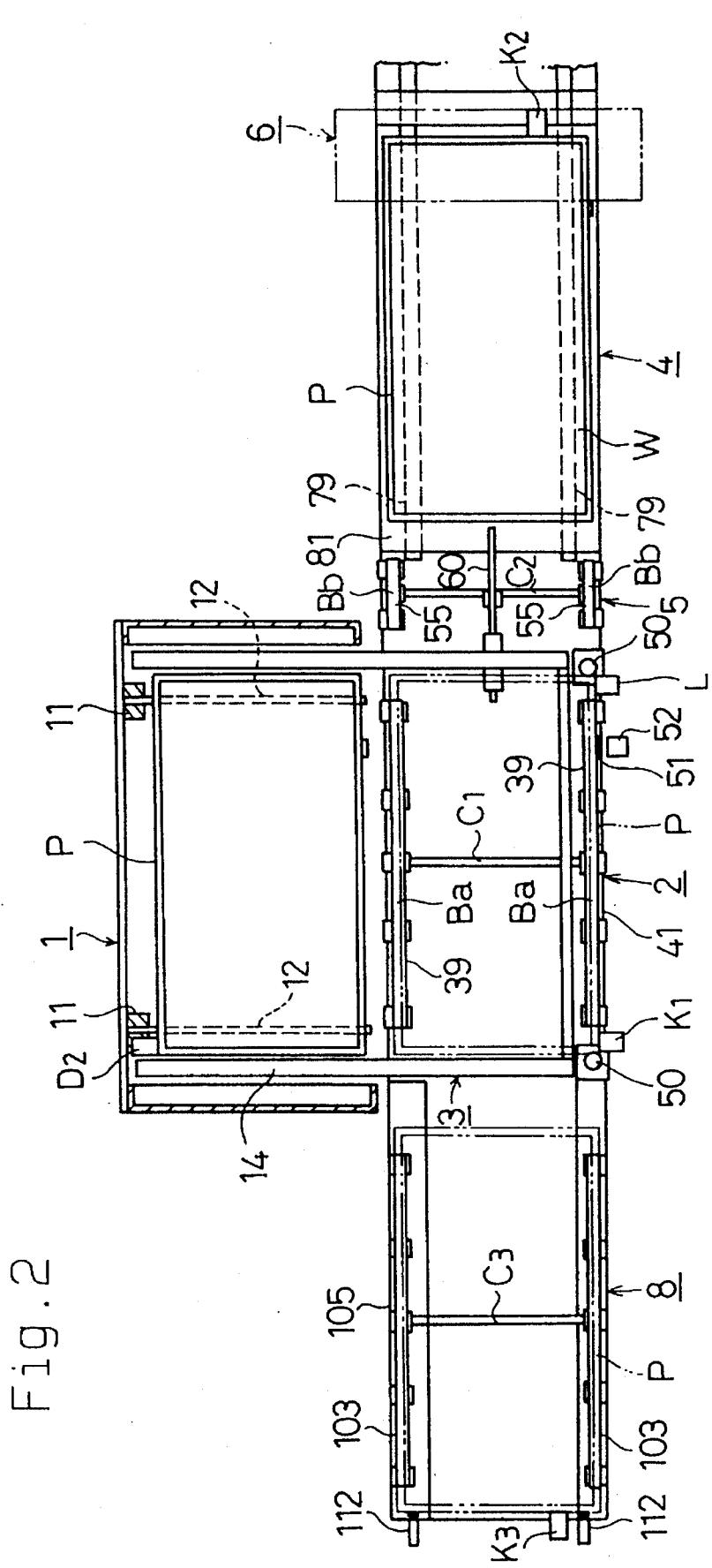
FIG. 2 is a plan view of FIG. 1.
Figure 3:
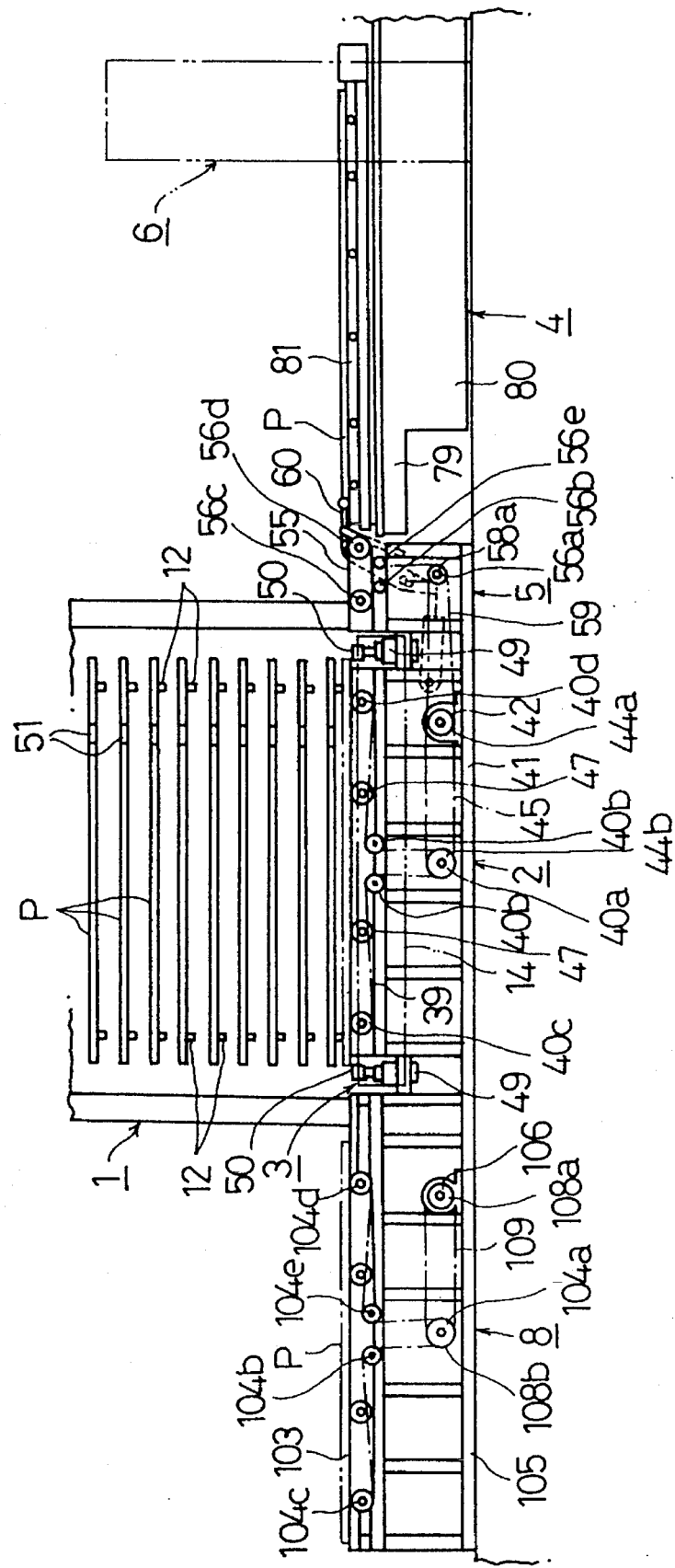
FIG. 3 is a partial front view of FIGS. 1 and 2.

As shown in FIGS. 1 through 3, a stocker 1, serving as pallet storage means, is a generally boxed shape of which the front surface is opened. The stocker 1 has a plurality of vertically spaced shelves. The pallets P, each carrying a workpiece W, are stored in the shelves in the stocker 1. An intermediate transport station 2 is located in front of the stocker 1. The pallet P is transported between the stocker 1 and the intermediate station 2 by means of a pallet transport device 3 serving as pallet transport means. A work station 4 is located in the vicinity of the intermediate station 2. A secondary transport device 5 is located between the work station 4 and the intermediate station 2.

The work station 4 includes a work table 81 and a laser beam machine 6 for working on a workpiece W placed on the table 81. The laser beam machine 6 includes a machine body 9, the work table 81, a laser head 7, a laser generator 10 and a chiller unit 37. When the workpiece W carried by the pallet P is transported into the work station 4 from the intermediate station 2 via the secondary device 5, the laser beam is irradiated from the laser head 7 onto the workpiece W for executing the laser process. The table 81 and the laser head 7 are moved according to control instructions from a controller 38.

A setting station 8 is located in the vicinity of the intermediate station 2. The pallet P is transported between the intermediate station 2 and the setting station 8. At the setting station 8, the workpiece W is mounted on or removed from the pallet P.

Figure 22:
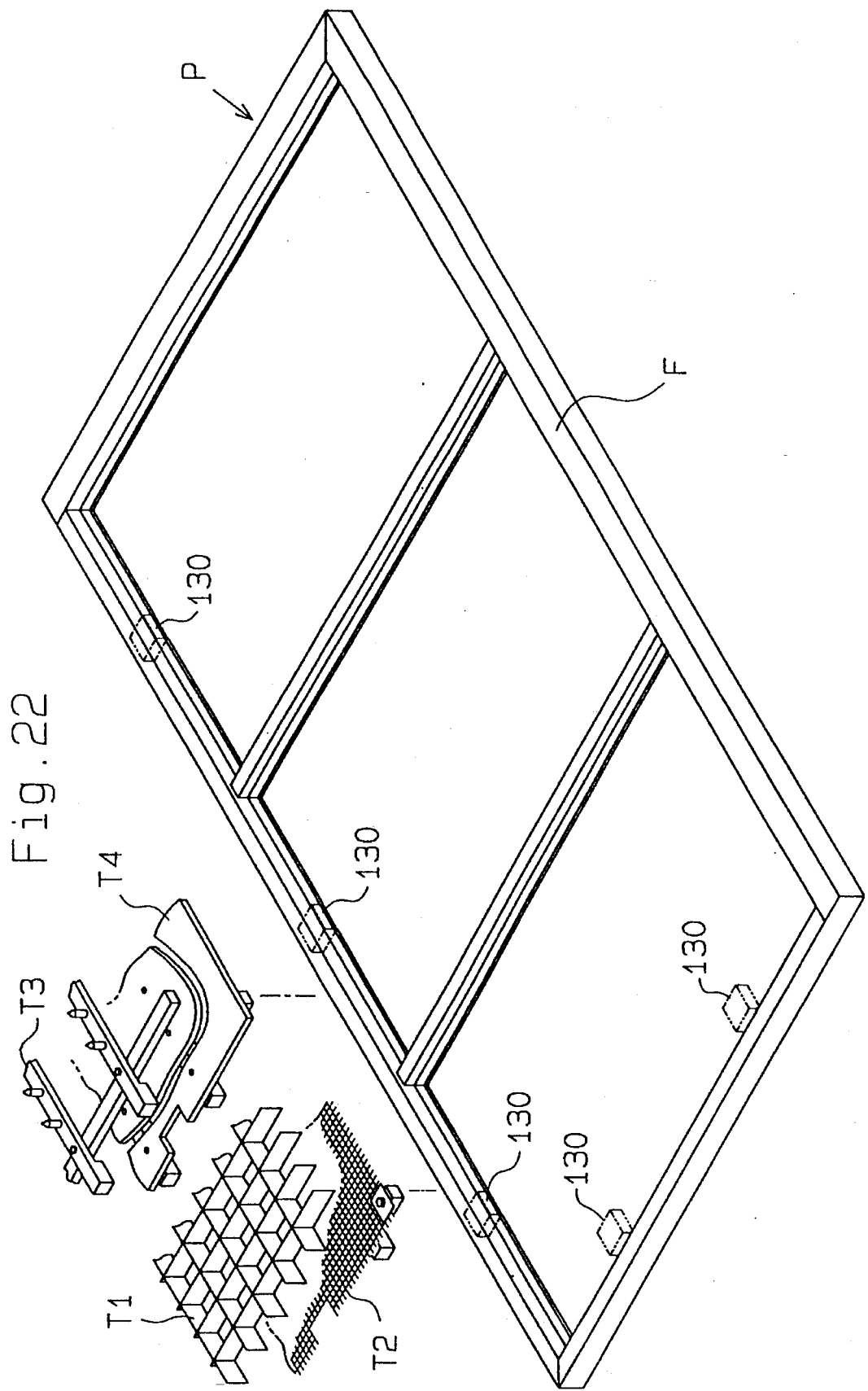
FIG. 22 is a perspective view showing the pallet.

As shown in FIG. 22, each pallet P includes a pallet frame F and one of four supports T1–T4. The support T1–T4 is selected among the four types according to the application, and attached on the frame F. The support may be a grid figure T1, a net figure T2, a multi spiked figure T3 or a specially dedicated figure T4. The most suitable pallet P is selected according to the type of workpiece W and the machining method.

Figure 23:
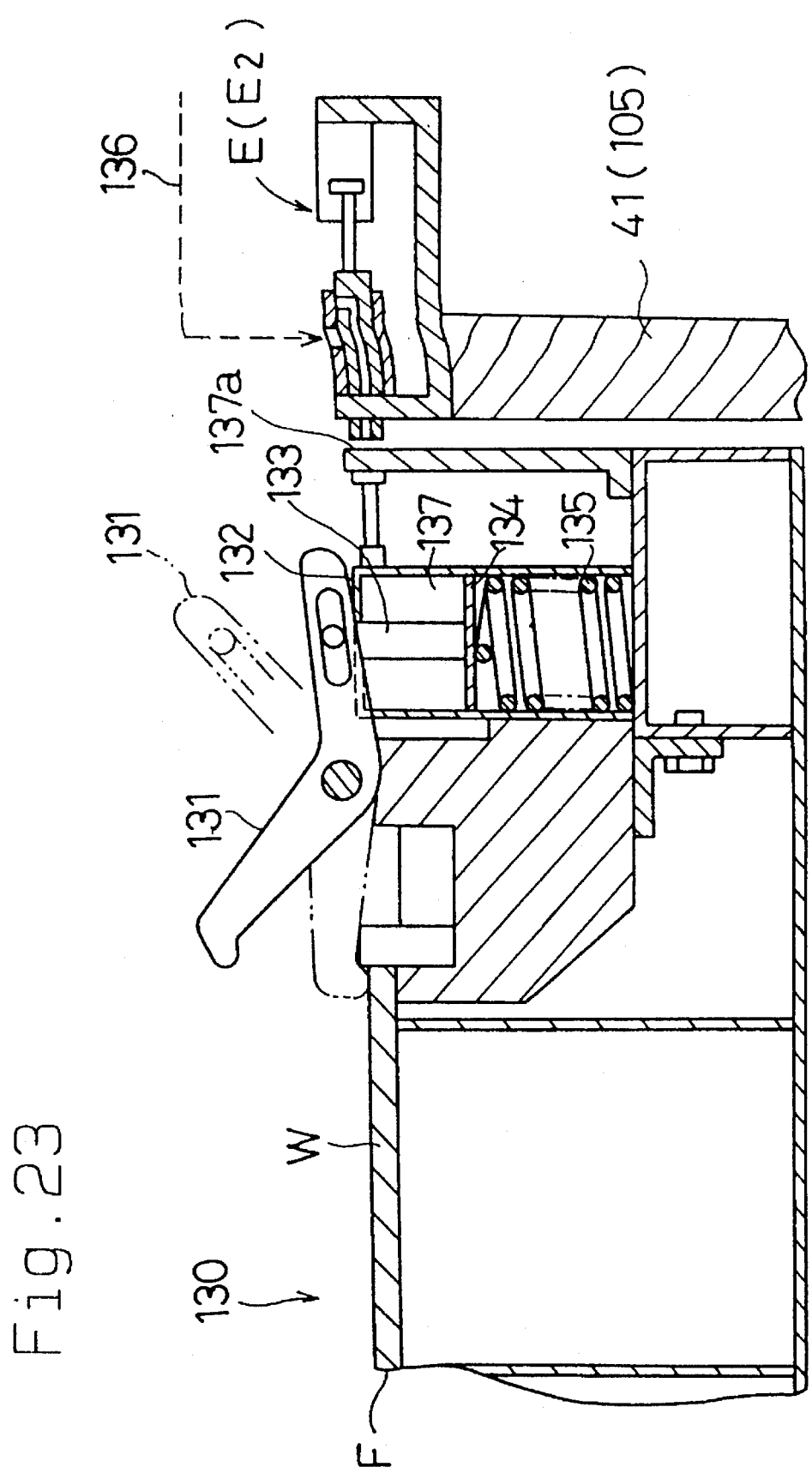
FIG. 23 is a cross sectional view showing a work clamp mechanism located at the pallet.

A plurality of work clamp devices 130 are provided on the top surfaces of the pallet frame F. Each one of the clamp devices 130 clamps the workpiece W placed on the support T1–T4 to the frame F. As shown in FIG. 23, the clamp device 130 connects a clamp lever 131 to the frame F in a swingable manner about the substantially central portion. A proximal end of the clamp lever 131 is connected to a rod 133 of an air cylinder 132. The lower portion of the rod 133 of the air cylinder 132 is secured to a bottom surface 134 of a cylinder chamber 137. The rod 133 is always upwardly urged by the force of a spring 135 located between the chamber 137 and the surface 134. Therefore, the clamp lever 131 is usually kept at the position indicated by a broken line. When the workpiece W is to be mounted on or removed from the pallet P, air is supplied into the cylinder chamber 137 by communicating an air inlet 137a connected to the chamber 137 with an air supply E1 or E2 connected to an air supply passage 136 and located on frames 41 and 105 of the intermediate and setting stations 2 and 8. As the pressure of the supplied air acts on the bottom surface 134, the bottom surface 134 is lowered by overcoming the force of spring 135. The clamp lever 131 is swung to the released position indicated by a solid line in response to the lowered displacement of the rod 133. After the workpiece W is mounted on or removed from the pallet P, the clamp lever 131 is swung back to the clamping position by discharging the supplied air in the chamber 137.

The construction of the stocker 1 and the pallet transport device 3 will now be described in detail. As shown in FIGS. 4 through 7, a pair of attaching channels 11 are vertically arranged in parallel on the inner surface of the rear wall of the stocker 1. A plurality of laterally paired support arms 12 are fitted to the channels 11 at predetermined intervals to horizontally extend in the forward direction. The pallet P supporting a workpiece W is removably placed on a pair of the support arms 12. A number of pallets P carried by the support arms 12 are stored in the shelves of the stocker 1.

A pair of vertical rails 13 having a channel shape are secured to the right and left inner surfaces of the stocker 1. The rails 13 extend vertically in parallel. A lift 14 has a generally U-shaped cross section as viewed in FIG. 6. A plurality of left-right guide rollers 16 and a plurality of front-rear guide rollers 17 arranged at both sides of the lift 14 on an attaching board 15. The left-right guide rollers 16 conform to grooves defined on the front and rear side surfaces of the rails 13. Further, the front-rear guide rollers 17 are conform to grooves defined on the front and rear side surfaces of the vertical rails 13. Therefore, the lift 14 is movably supported along the vertical rails 13.

Figure 5:
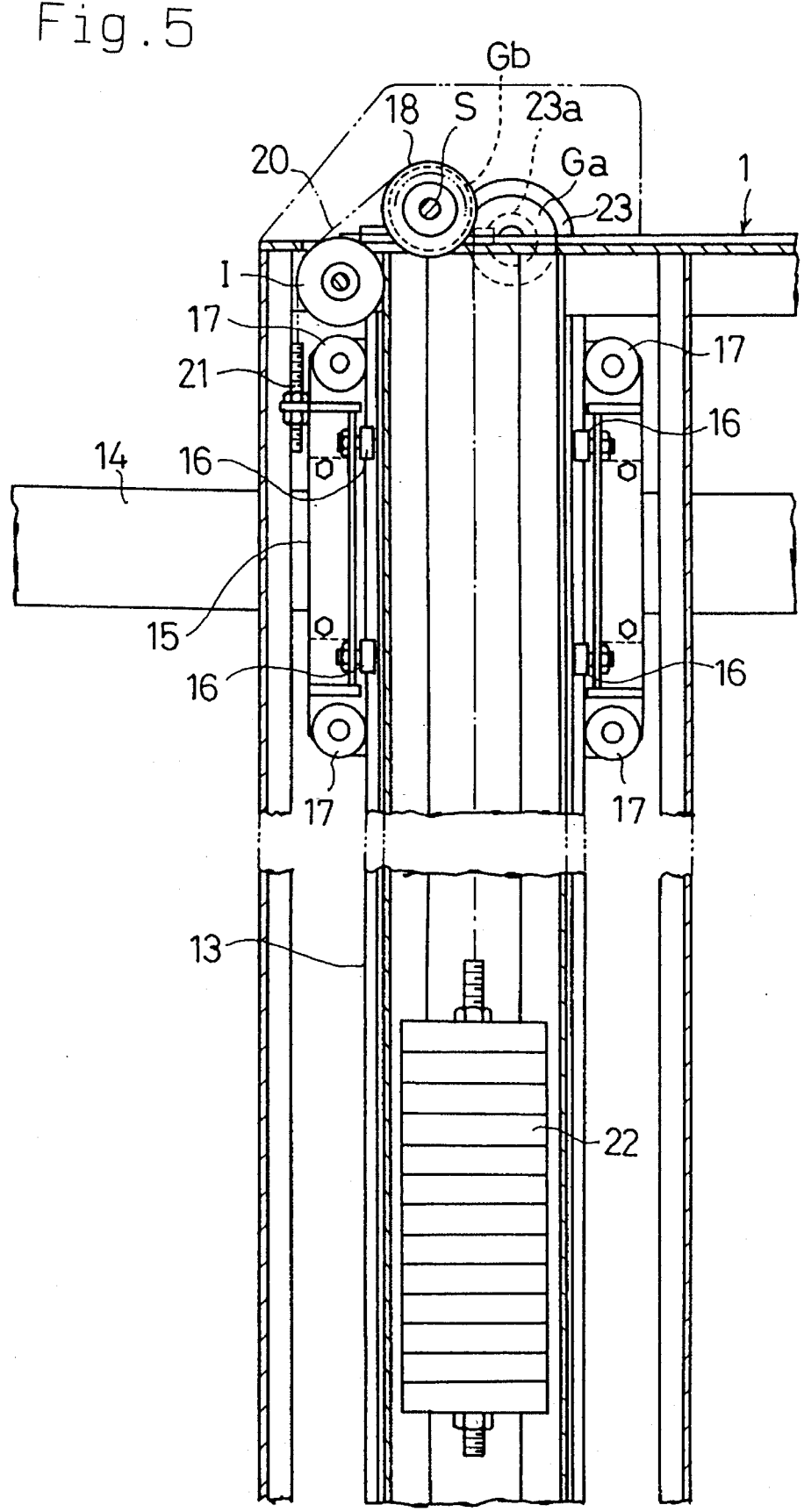
FIG. 5 is a partial enlarged cross sectional view taken along line A—A of FIG. 4.

As shown in FIG. 5, a pair of sprockets 18 is supported by a rotary shaft S at the upper portion of the stocker 1. Mid-portions of chains 20 are mounted on the sprockets 18. A first end of each chain 20 is connected to an attaching board 15 of the lift 14 with a fitting 21. Balance weights 22, which have a weight comparable to the lift 14, are suspended from a second end of each chain 20. Corresponding to the sprockets 18, idling sprockets I are supported by the stocker 1, so as to guide the first ends of the chains 20 to the fittings 21. A lift motor 23 is located on the top surface of the frame of the stocker 1. A drive gear Ga is connected to a drive shaft of the lift motor 23 via a speed reducer. The drive gear Ga engages with a driven gear Gb mounted on a rotary shaft S. When the lift motor 23 is driven in either the forward or backward direction, the rotation thereof is transmitted to the sprockets 18, and then to the chains 20 via the gears Ga and Gb such that the lift 14 is moved up or down accordingly.

Figure 4:
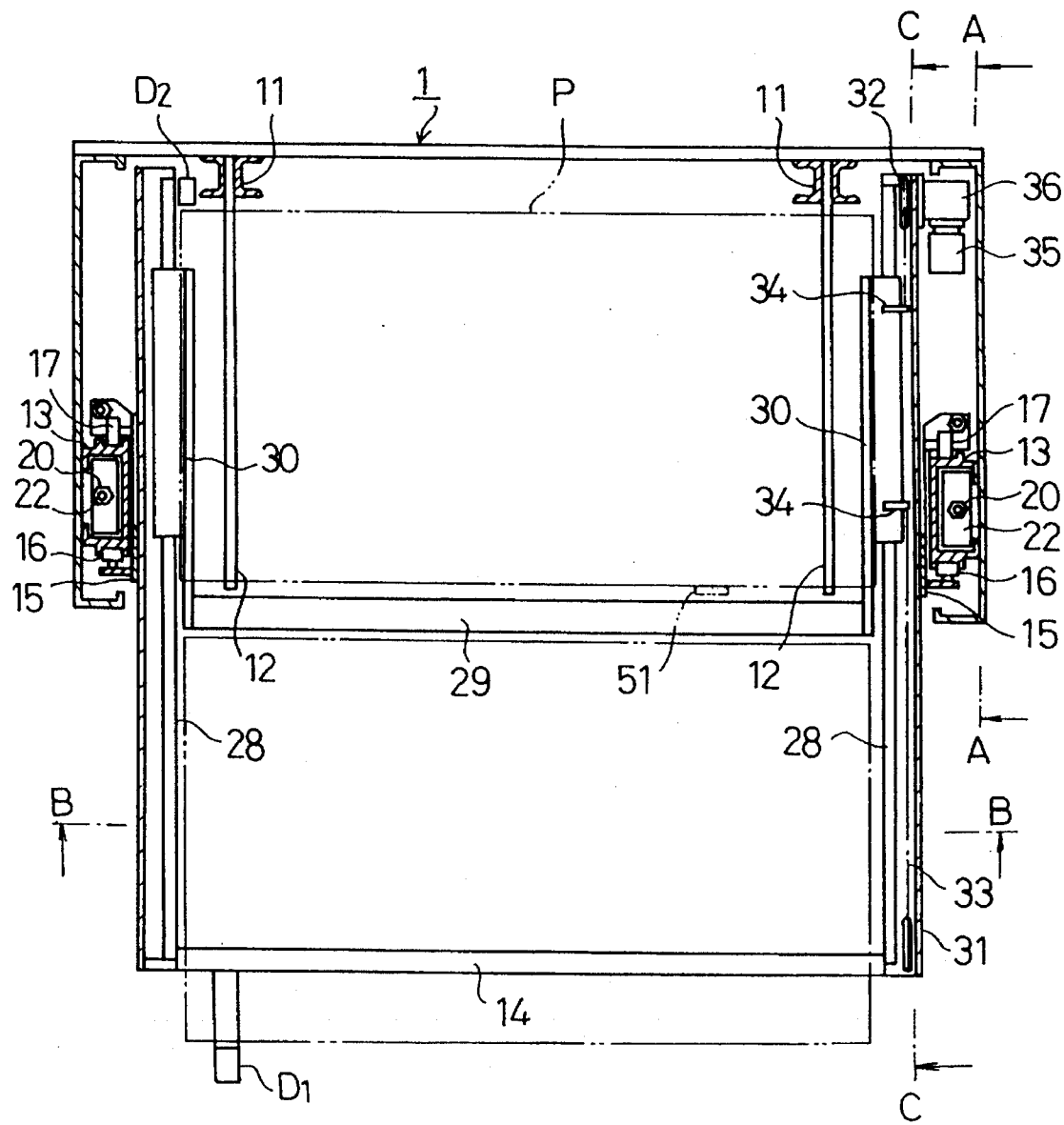
FIG. 4 is an enlarged cross sectional view showing a stocker of the laser beam machining device of FIG. 2.
Figure 6:
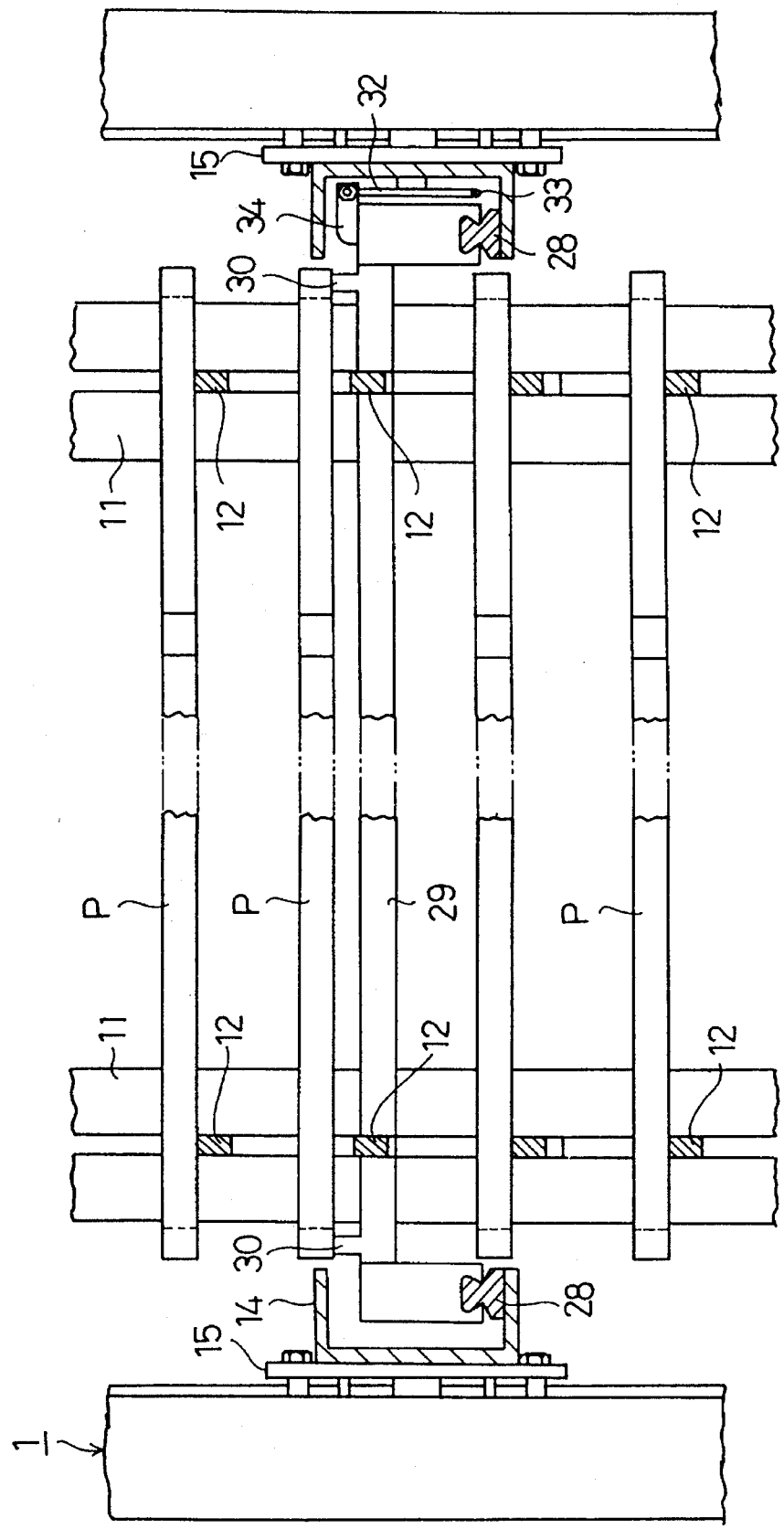
FIG. 6 is a partial enlarged cross sectional view taken along line B—B of FIG. 4.
Figure 7:
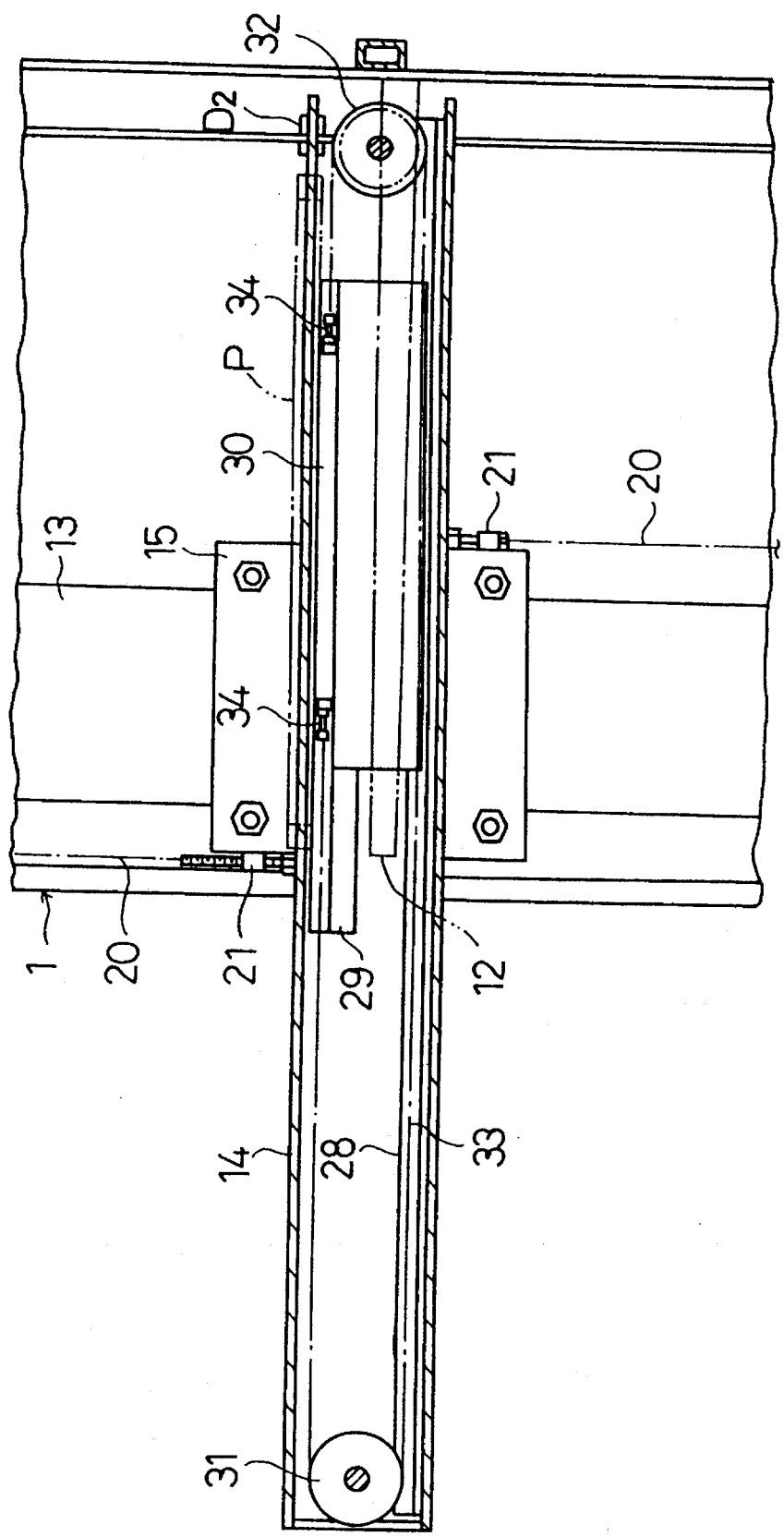
FIG. 7 is a partial enlarged cross sectional view taken along line C—C of FIG. 4.

As shown in FIGS. 4, 6 and 7, a pair of horizontal rails 28 extend forwardly in parallel within side frames of the lift 14. A drawing unit 29 engages and is supported by the rails 28 for frontward and rearward movement. A pair of protrusions 30 for receiving a pallet P from the support arms 12 are formed on the top surface of the unit 29. Sensors D1, D2 are provided at the front and rear ends of any one of the rails 28. Detection signals from the sensors D1, D2 are transmitted to the controller 38. A pair of rotatable sprockets 31, 32 is located at one side of the frame of the lift 14, each sprocket being located at a position corresponding to the front and rear ends of the rails 28, respectively. Both end portions of a chain 33 are secured to the drawing unit 29 by fittings 34. The chain 33 runs between the pair of sprockets 31 and 32.

A motor 35 for transporting a pallet is located at one exterior side wall of the lift 14. The rear sprocket 32 is rotated, by a speed reducer 36, in response to the rotational motion of the motor 35. When the sprocket 32 is rotated in the counter-clockwise direction of FIG. 7, the drawing unit 29 is frontwardly moved out from the stocker 1 with chain 33. When the rear sprocket 32 is rotated in the clockwise direction with respect to FIG. 7, the unit 29 is moved into the stocker 1 with the chain 33.

As shown in FIG. 6, the lift 14 is vertically moved to a predetermined position corresponding to a pallet P stored in the stocker 1 by the driving motion of the motor 23. After the drawing unit 29 is retracted into the stocker 1, the lift 14 is raised by a predetermined amount such that the pallet P is transferred from the supporting arms 12 onto the protrusions 30 of the unit 29. When replacing a pallet, the drawing unit 29 is vertically moved, together with the lift 14, to a predetermined position corresponding to a pair of supporting arms 12 in the stocker 1. After the drawing unit 29 is retracted into the stocker 1, the lift 14 is lowered by a predetermined amount, and the pallet P is transferred from the drawing unit 29 onto the supporting arms 12.

Figure 8:
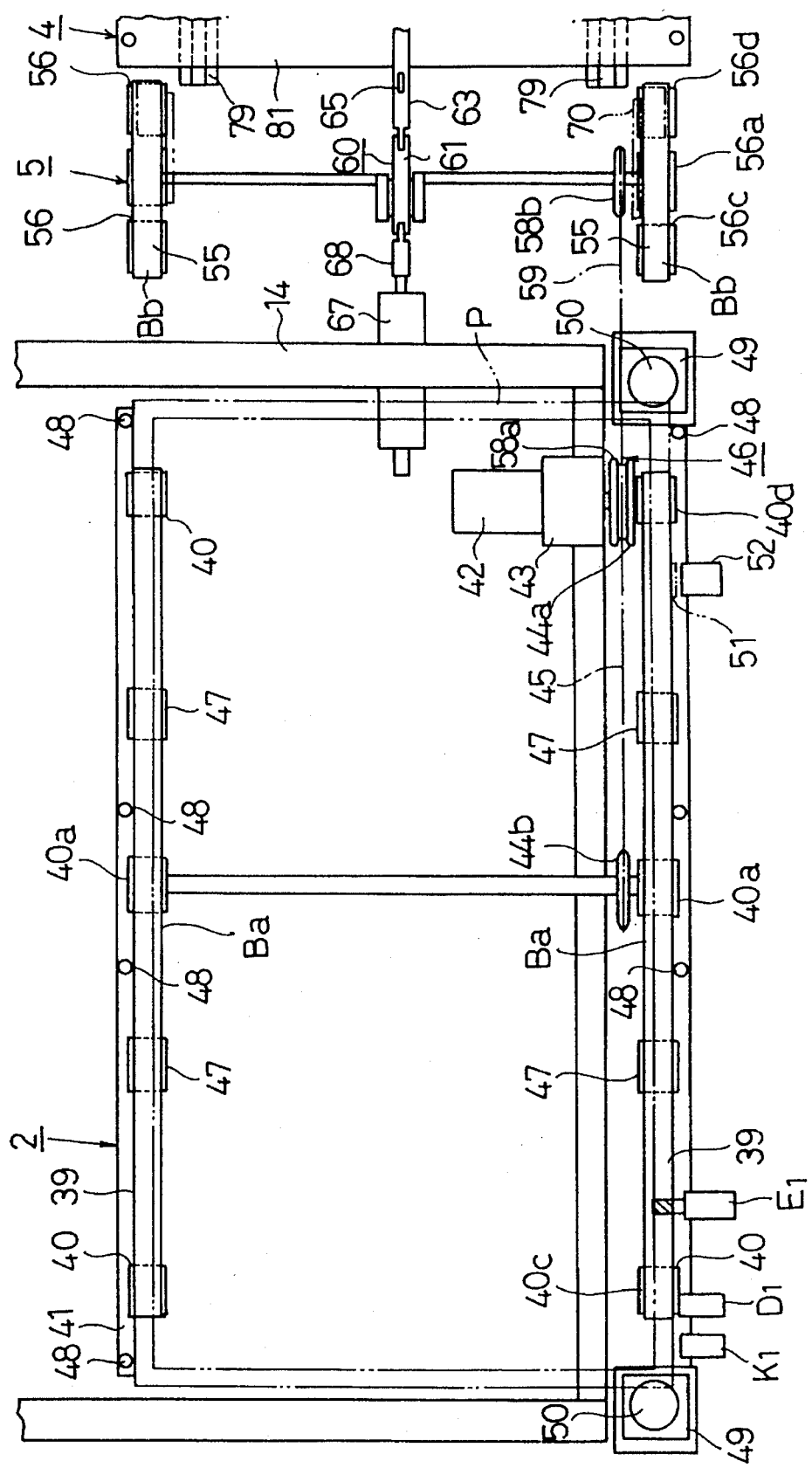
FIG. 8 is an enlarged plan view showing an intermediate transport station and secondary transport device in the laser beam machining device of FIG. 2.
Figure 9:
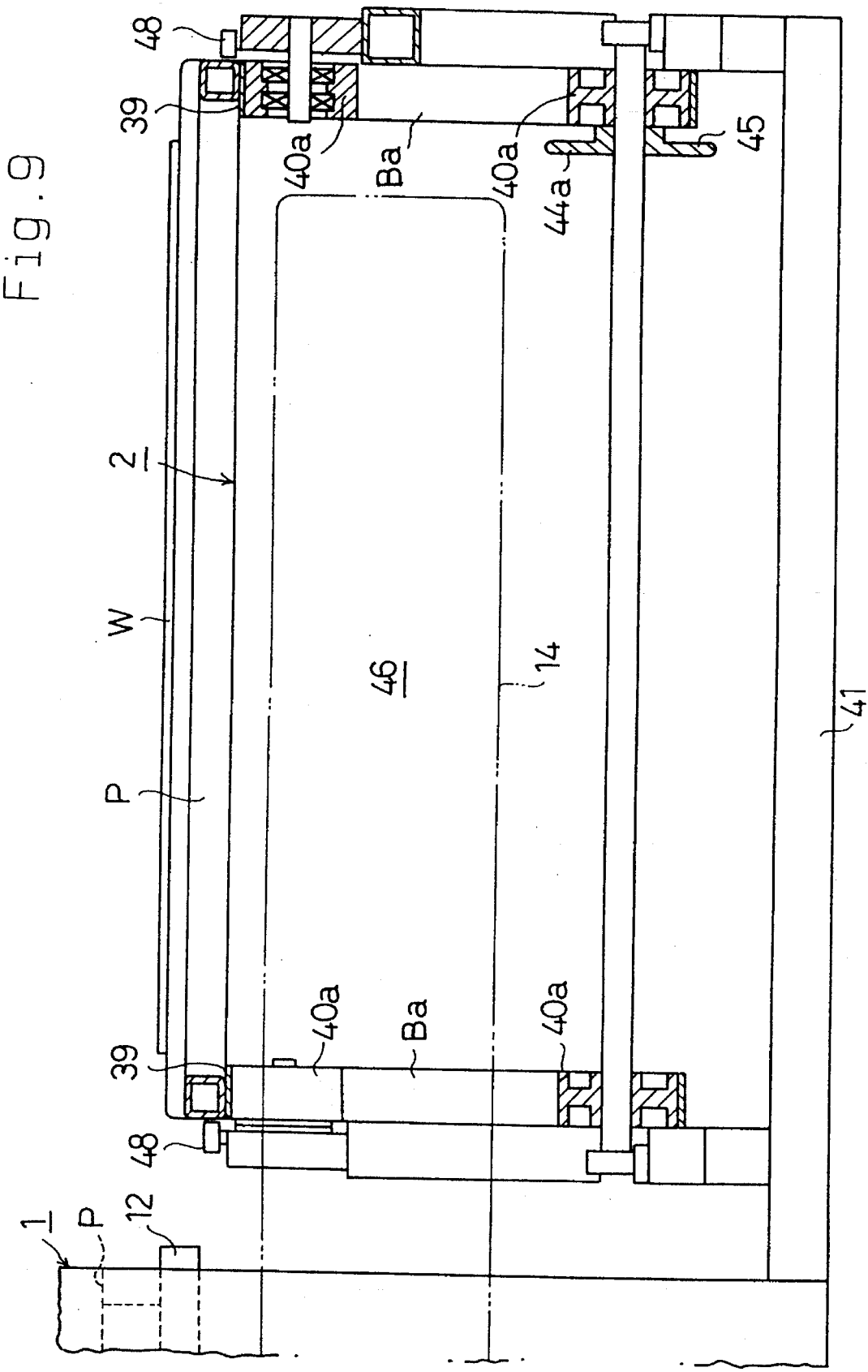
FIG. 9 is an enlarged side cross sectional view showing the intermediate transport station.
Figure 10:
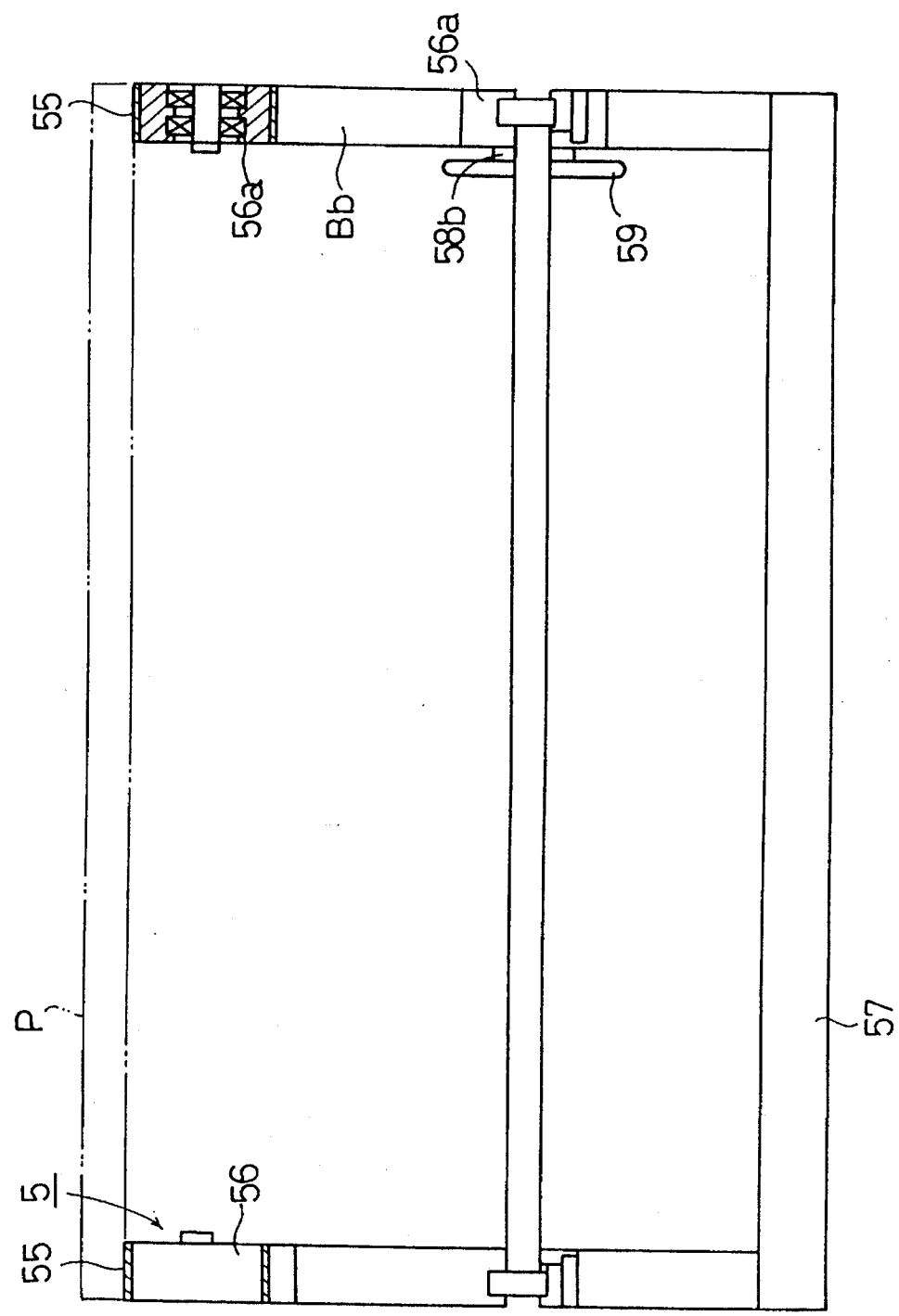
FIG. 10 is an enlarged side cross sectional view showing a secondary transport device.

The structure of the intermediate transport station 2 will now be described in detail. As shown in FIGS. 3, 8 and 9, a pair of endless belts Ba are located on a frame 41 and supported on a plurality of drive rollers 40a, 40b, 40c, 40d so as to form belt conveyors 39. A motor 42 for conveying is located on the frame 41. When the motor 42 is activated, its rotation is transmitted to the sprocket 44b and the roller 40a by a chain 45, which is driven by a speed reducer 43 and sprocket 44a. Simultaneously the rotation is transmitted to the roller 40a located at the other side, via a link shaft Cl, such that the belt conveyors 39 are integrally driven. Rollers 47 are idling rollers.

A space 46 for accommodating the lowering of the lift 14 is defined within the frame 41 of the intermediate station 2. The space 46 corresponds to the lower portion of the lift 14. When the lift 14 carrying a pallet P, which carries a workpiece W, is lowered into the space 46 as shown in FIG. 9, the pallet P is transferred from the drawing unit 29 to the conveyors 39. When the lift 14 is lifted upwardly from the space 46 while a pallet P is placed on the belt conveyors 39, the pallet P is transferred from the belt conveyors 39 to the drawing unit 29.

The air supply E1 is located at the front portion of the intermediate transport station 2. When the pallet P is placed at the intermediate station 2, the air supply E1 will confront an air inlet 137a located at the pallet P side (FIG. 23). As the air supply E1 is connected with the air inlet 137a, air is supplied into the air cylinder chamber 137.

A plurality of guide rollers 48 are provided on the frame 41 in the vicinity of the conveyors 39. The front and rear positions of the pallet P are regulated in such a way that the guide rollers 48 engage with the front and rear edges of the pallet P placed on the intermediate station 2.

Figure 11:
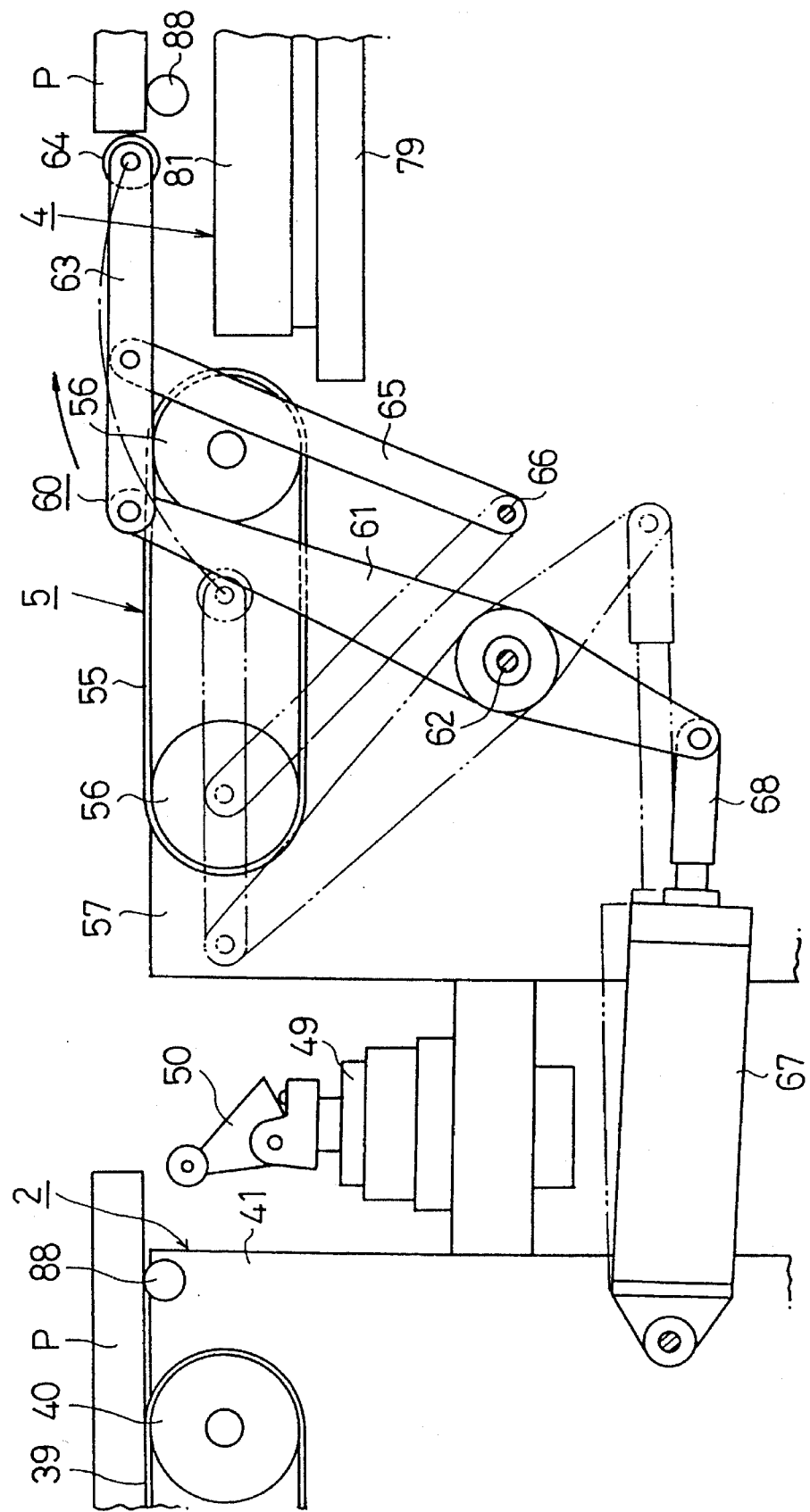
FIG. 11 is an enlarged front view showing a pallet thrust mechanism of the secondary transport device.

As shown in FIGS. 8 and 11, a pair of stopper cylinders 49 having a shock absorber function are located at both sides of the front section of the frame 41. Swing stoppers 50 with a roller are connected to the upper end of a piston rod. When the pallet P is to be transported from the work station 4 to the intermediate station 2, the stopper 50 located at the left side in FIG. 8 is projected upward and engages with the left edge of the pallet P. The stopper 50 acts like a shock absorber such that the pallet P is stopped at a predetermined position on the intermediate transport station 2. When the pallet P is transported from the setting station 8 to the intermediate station 2, the stopper 50 located at the right side in FIG. 8 is upwardly projected and engages the right edge of the pallet P such that the pallet P is stopped at a predetermined position on the intermediate station 2.

A first pallet sensor K1, formed by a proximity sensor, is located at the front left end portion of the intermediate station 2. The first pallet sensor K1 detects whether the pallet P is at the predetermined position on the intermediate station P, and transmits a detection signal to the controller 38.

As shown in FIGS. 1, 2 and 8, a memory medium 51 is provided at the front surface of each pallet P. Each memory medium 51 stores the following information in advance: type of pallet P, type of workpiece W, method for the workpiece W, and the storage position of the pallet P in the stocker 1. According this embodiment, a bar code system is employed as the memory medium 51.

A reader 52 is located at the front portion of the intermediate station 2. When a pallet P supporting a workpiece W is placed on the intermediate station 2, the memory medium 51 located on the pallet P confronts the reader 52. The information stored in the memory medium 51 is read by the reader 52, and transmitted to the controller 38 located at the side of the work station 4. After that, when the pallet P is transported to the work station 4, the workpiece W is machined according to the information read by the reader 52. Also, the pallet P is stored in a predetermined location in the stocker 1 by means of the pallet transport device 3. However, when the controller 38 stores a sequence program including pallet information in advance, that information can be transmitted when a signal indicating that the pallet has passed is confirmed.

As shown in FIG. 2, a pallet passing sensor L, formed by a limit switch, is located at the right end portion of the intermediate station 2. The passing sensor L detects the movement of the pallet P from the intermediate station 2 to the work station 4, and transmits a detection signal to the controller 38.

The structure of the secondary transport device 5 will now be described in detail. As shown in FIGS. 8, 10 through 12, a pair of endless belts Bb held between a plurality of rollers 56a, 56b, 56c, 56d and 56e form belt conveyers 55 which circularly move around a frame 57. When the motor 42 is activated, its rotation is transmitted to a sprocket 58b and a roller 56a by the speed reducer 43, sprockets 58a and 58b, and a chain 59. Simultaneously, the rotation is transmitted to the roller 56a located at the other side by a link shaft C2 such that both belt conveyers 55 are integrally driven.

A pallet thrust mechanism 60 is located between the belt conveyers 55, and positively thrusts a pallet P transported from the intermediate station 2 toward the work station 4 from the rear side of the pallet P.

More specifically, a swing lever 61 is rotatably connected to the frame 57 at the central portion thereof by a support shaft (FIG. 11). An urging roller 64 is supported at the upper end of the lever 61 by an arm 63. A support lever 65 is swingably connected to the frame 57 at its lower end by a support shaft 66 such that the support lever 65 moves in parallel to the swing lever 61. The arm 63 is linked to the upper end of the support lever 65.

An urging cylinder 67 is swingably connected at one end to the frame 41 of the intermediate station 2. A rod 68 is linked to the lower end of the swing lever 61. When a pallet P is transferred towards the work station 4, the rod 68 is retracted as the rear edge of the pallet P approaches the right end of the belt conveyers 55 (as viewed in FIG. 11). Therefore, the swing lever 61 and support lever 65 are swung from the positions indicated by two dotted lines to the positions indicated by solid lines in FIG. 11 such that the pallet P is urged in the machining direction by the urging roller 64.

Figure 12:
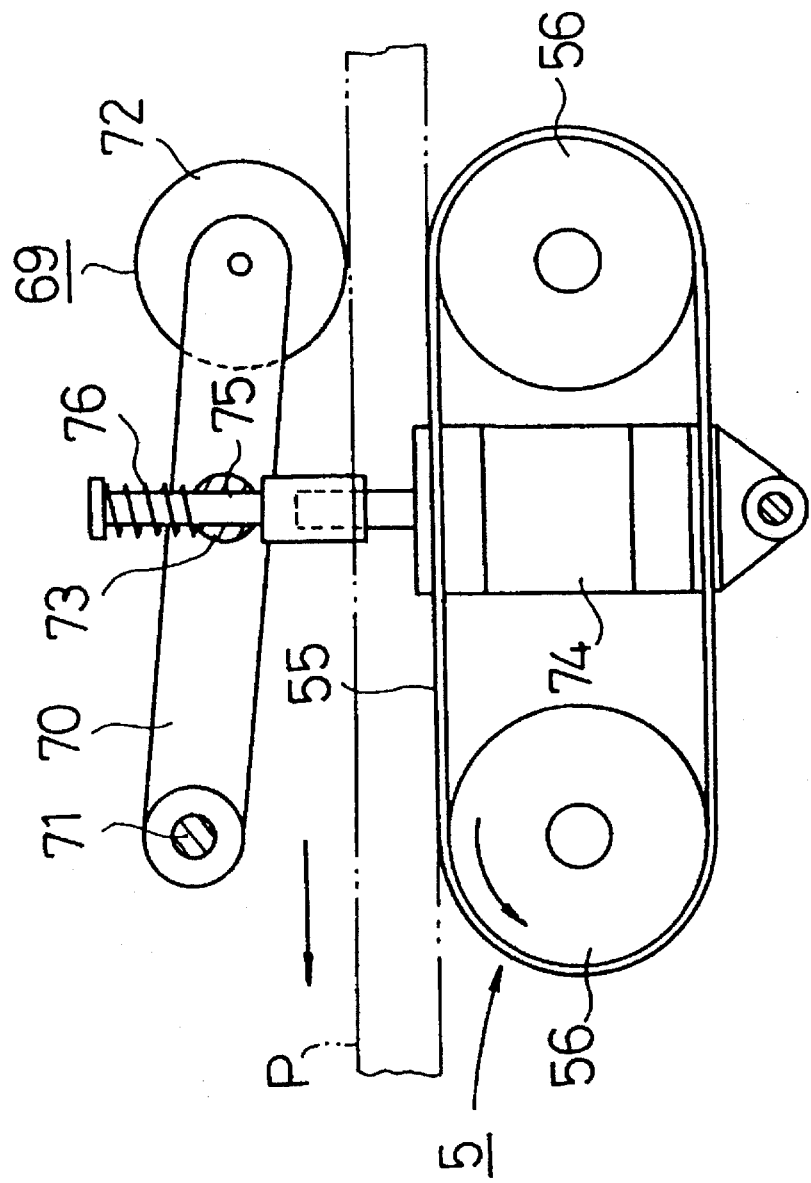
FIG. 12 is an enlarged front view showing a pallet drawing mechanism of the secondary transport device.

As shown in FIGS. 8 and 12, pallet drawing mechanisms 69 are located above the opposed belt conveyers 55. When the pallet P carrying the machined workpiece W is to be transported from the work station 4 to the intermediate station 2, the pallet drawing mechanisms 69 urge the pallet P onto the belt conveyers 55 and draw the pallet P onto the secondary transport device 5.

More specifically, a pair of support arms 70 are swingably connected to the frame 57 at one end by support shafts 71. Urging rollers 72 are supported at the opposite ends of the support arms 70 which, at times, contact the belt conveyers 55. A link shaft 73 is secured to the central portions of the support arms 70. An urging cylinder 74 is swingably connected, at its lower end, with the frame 57. A pin 75 is received by the rod of the cylinder 74. A spring 76 is located between an end of the pin 75 and the link shaft 73 such that the urging roller 72 is urged toward the belt conveyers 55.

The rod of the cylinder 74 is normally extended such that the urging roller 72 is kept at a position spaced apart from the belt conveyers 55. When a pallet P is transported from the work station 4 to the transport station 2, the rod of the cylinder 74 is retracted as the front edge of the pallet P (with respect to the transport direction) approaches the right end of the belt conveyer 55 (as viewed in FIG. 12). The drawing of the pallet P with the belt conveyers 55 is assisted by the urging roller 72, which is urged against the pallet P on the belt conveyers 55 due to the urging force of the spring 76.

The structure of the work station 4 will now be described referring to FIGS. 2 and 13 through 15. A pair of guide rails 79 are located in parallel on a frame 80. A work table 81 is movably supported on the rails 79. A toothed pulley 83 is rotatably supported by the frame 80. A drive nut 82 is fitted to the inner circumference of the pulley 83. A threaded rod 84 is horizontally secured at the lower portion of the work table 81 and threaded to the drive nut 82.

A motor 85 is located on the frame 80 for moving the table. A toothed belt 87 runs between a toothed drive pulley 86 mounted on the drive shaft of the motor 85 and the toothed pulley 83. When a workpiece W is to be machined on the pallet P on the work table 81, the work table 81 is moved with threaded rod 84 according to the rotation of the drive nut 82 by the pulleys 86 and 83 and the toothed belt 87 as a result of the rotation of the motor 85.

Figure 13:
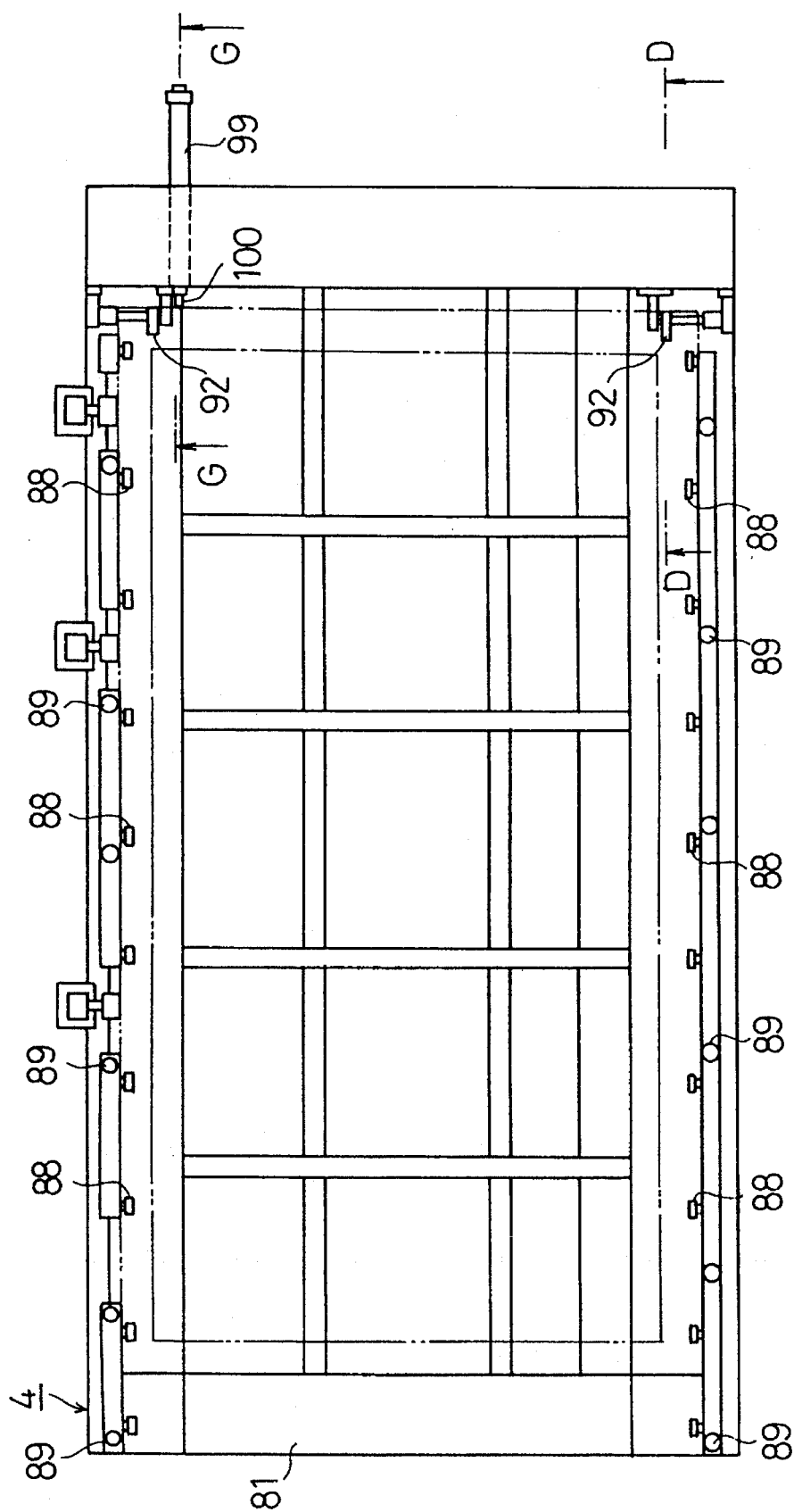
FIG. 13 is an enlarged plan view showing the work station of the laser beam machining device shown in FIG. 2.
Figure 14:
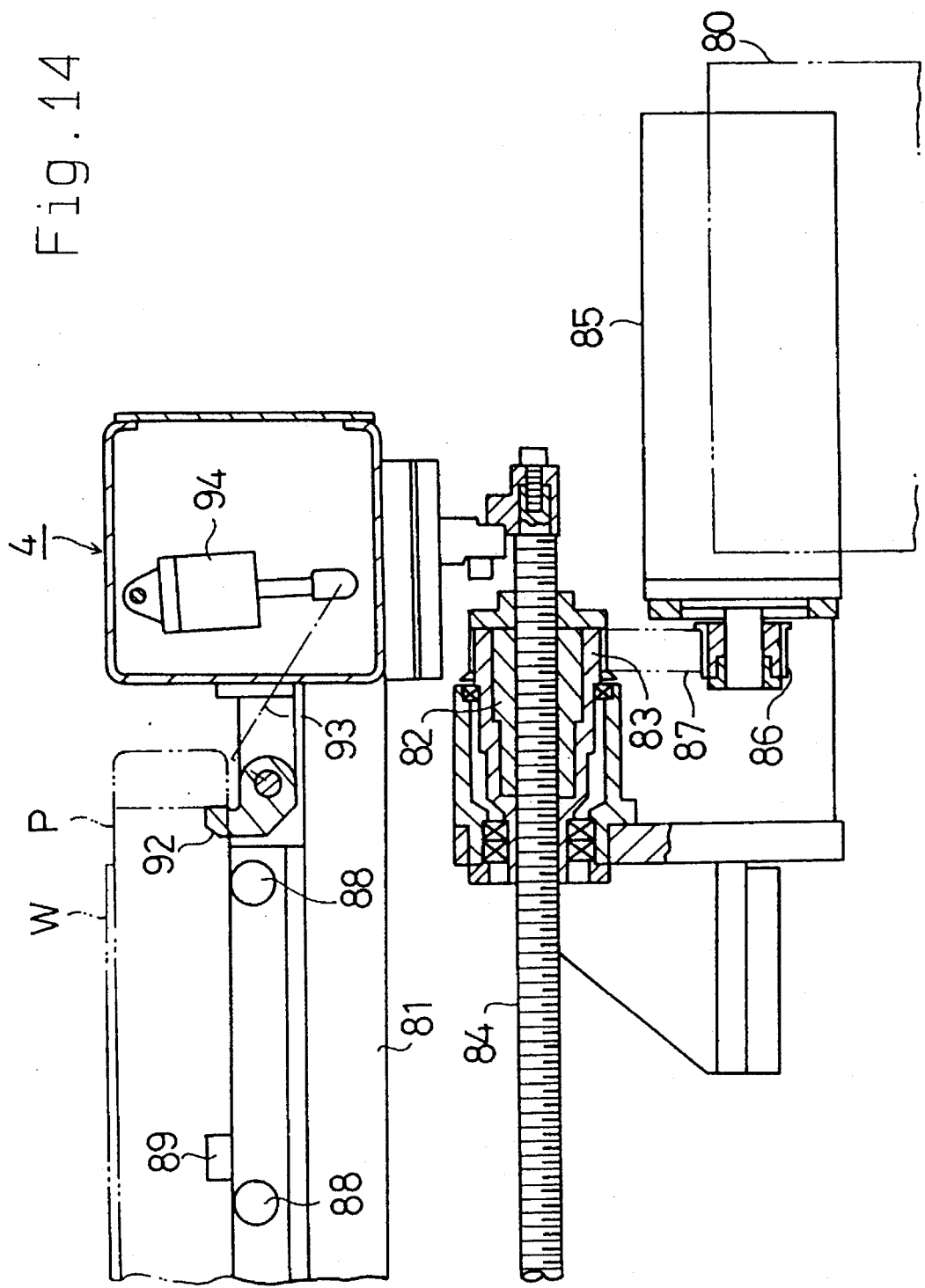
FIG. 14 is an enlarged cross sectional view substantially taken along line D—D of FIG. 13.
Figure 15:
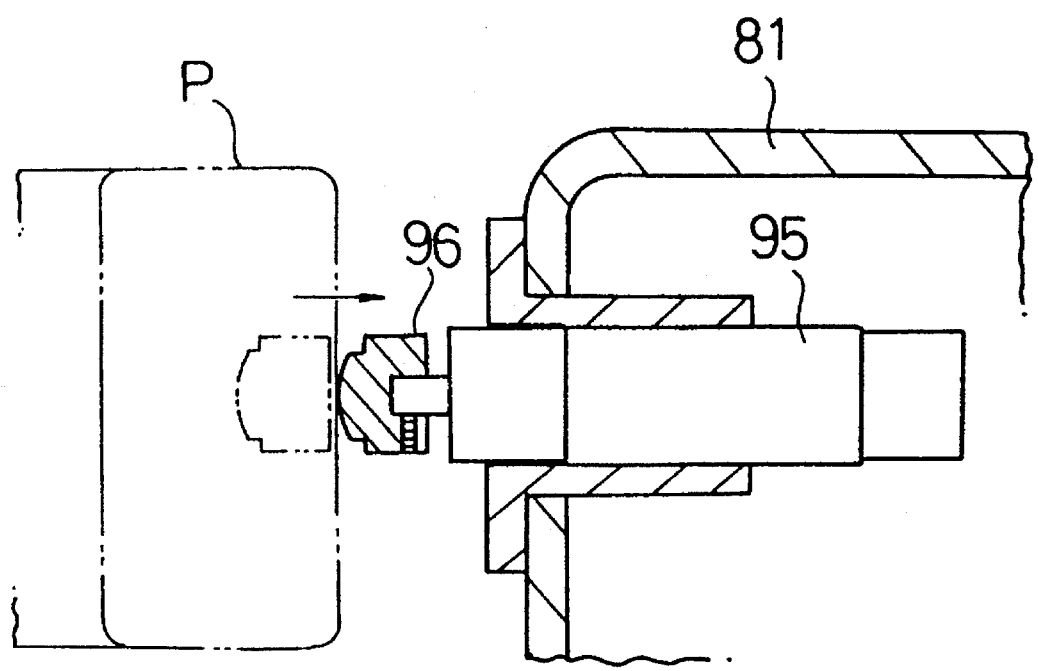
FIG. 15 is an enlarged cross sectional view taken along line G—G of FIG. 13.

As shown in FIGS. 13 and 14, a plurality of transport rollers 88 are located on both upper front and rear edges of the work table 81. A pallet P which is to be transported from the intermediate transport station 2 onto the work station 81 will be moved and supported by the rollers 88. A plurality of guide rollers 89 are located on both upper front and rear edges of the work table 81. Therefore, the rollers 89 engage with side edges of the pallet P on the work table 81 such that the motion of the pallet P is regulated in the lateral direction.

A plurality of urging bodies 96 for positioning the pallet are located along the rear edge of the work table 81 and are actuated with cylinders 95. The pallet P is moved to a predetermined location by the bodies 96. That is, the pallet P is clamped between the urging bodies 96, which are moved toward the pallet P by the cylinder 95, and the rollers 89. A pair of hooks 92 are swingably supported at the upper right end portion of the work table 81 so as to link with a rod of a cylinder 94 with levers 93. When the pallet P is to be transported from the intermediate transport station 2 to the work table 81, the hooks 92 are swung in the clockwise direction (as viewed in FIG. 14) with a cylinder 94 so as to engage with the inner right edge of the pallet P. This will draw the pallet P to a predetermined position over the work table 81. As shown in FIG. 2, a second sensor K2, formed by a proximity sensor, is located at the right end portion of the work station 4. The sensor K2 transmits a signal to the controller 38 when the pallet P is transported to the predetermined position on the work table 81.

As shown in FIGS. 13, a cylinder 99 is located at the right end portion of the work table 81 and extends beyond the work station 81. An urging piece 100 is connected to the end of the rod of the cylinder 99. After the workpiece W is machined, the pallet P supporting the machined workpiece W is transferred from the work table 81 toward the secondary transport device 5 by means of the urging piece 100, which is moved leftward according to the projecting motion of the piston rod of the cylinder 99. The pallet P is moved while the engagement of the urging bodies 90 and hooks 92 are in their released positions.

The structure of the setting station 8 will now be described referring to FIGS. 1 and 16 through 18.

A pair of endless belts Bc are fitted on a plurality of rollers 104a, 104b, 104c and 104d so as to form belt conveyers 103, which are located on a frame 105. A motor 106 for driving the belts is located at the inside of the frame 105. The rotation of the motor 106 is transmitted to sprocket 108b and the roller 104a coaxially connected with the sprocket 108b via a speed reducer 107, sprockets 108a and 108b, and a transmission chain 109. Simultaneously, the rotation is transmitted to the roller 104a located at the other side, via a link shaft C3, such that both belt conveyers 103 are integrally driven. Rollers 110 are idling rollers.

A plurality of guide rollers 111 are located on the frame 105 in the vicinity of the belt conveyers 103. These rollers 111 engage with the front and rear edges of the pallet P placed on the setting station 8 such that the front and rear position of the pallet P is regulated.

Figure 16:
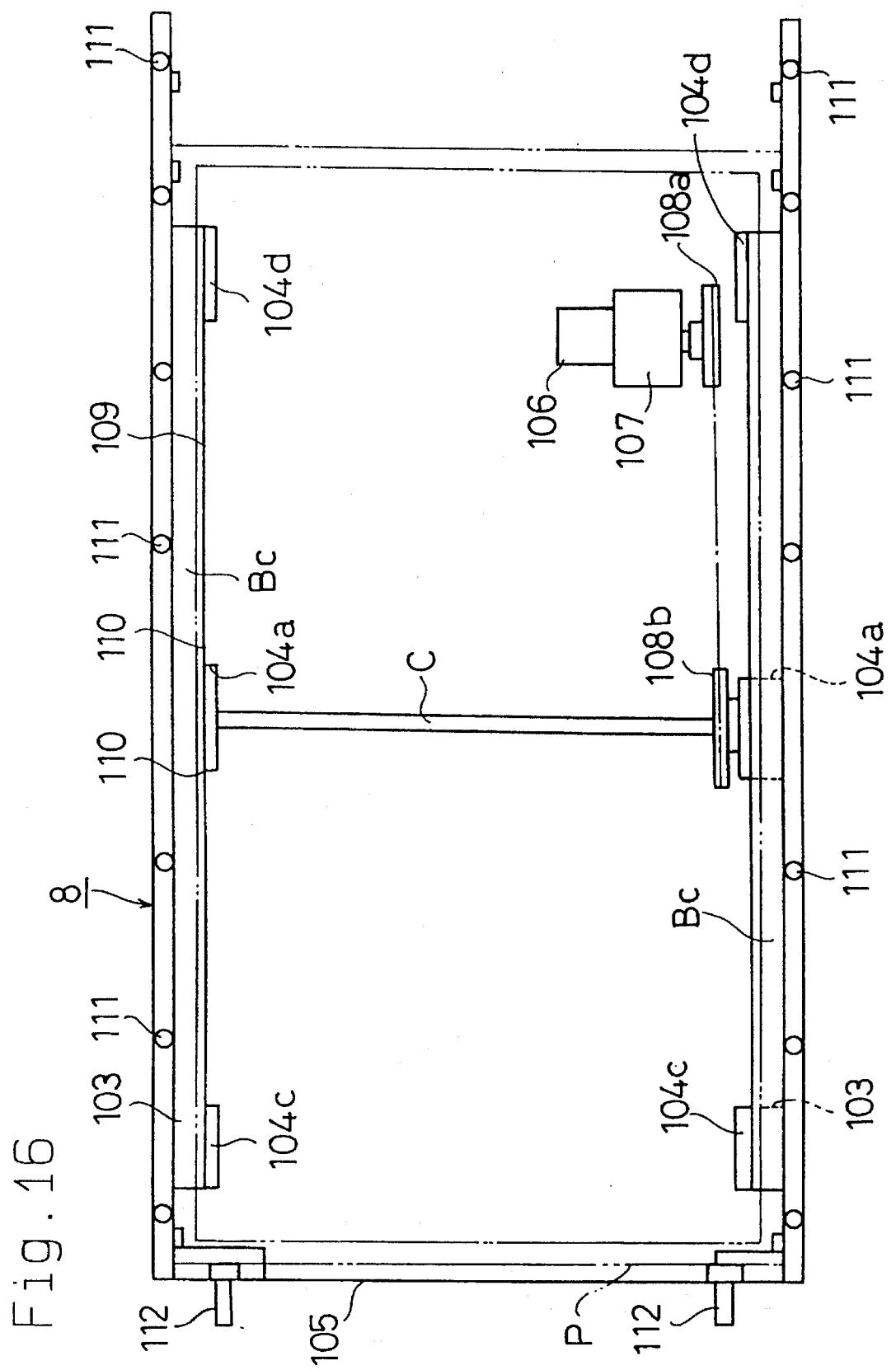
FIG. 16 is an enlarged plan view showing the setting station in the laser beam machining device shown in FIG. 2.

As shown in FIGS. 2 and 16, elastic stoppers 112, made of rubber cushion or the like, are located at two locations on the left side frame 105. When the pallet P is transported from the intermediate transport station 2 to the setting station 8, the stoppers 112 engage with the left edge of the pallet P such that the pallet P is positioned at a predetermined location on the setting station 8. A third pallet sensor K3, formed by an proximity sensor, is located at the right end portion of the setting station 8. The pallet sensor K3 transmits a signal to the controller 38 when the sensor K3 detects that the pallet P is at the predetermined position on the setting station 8.

Figure 17:
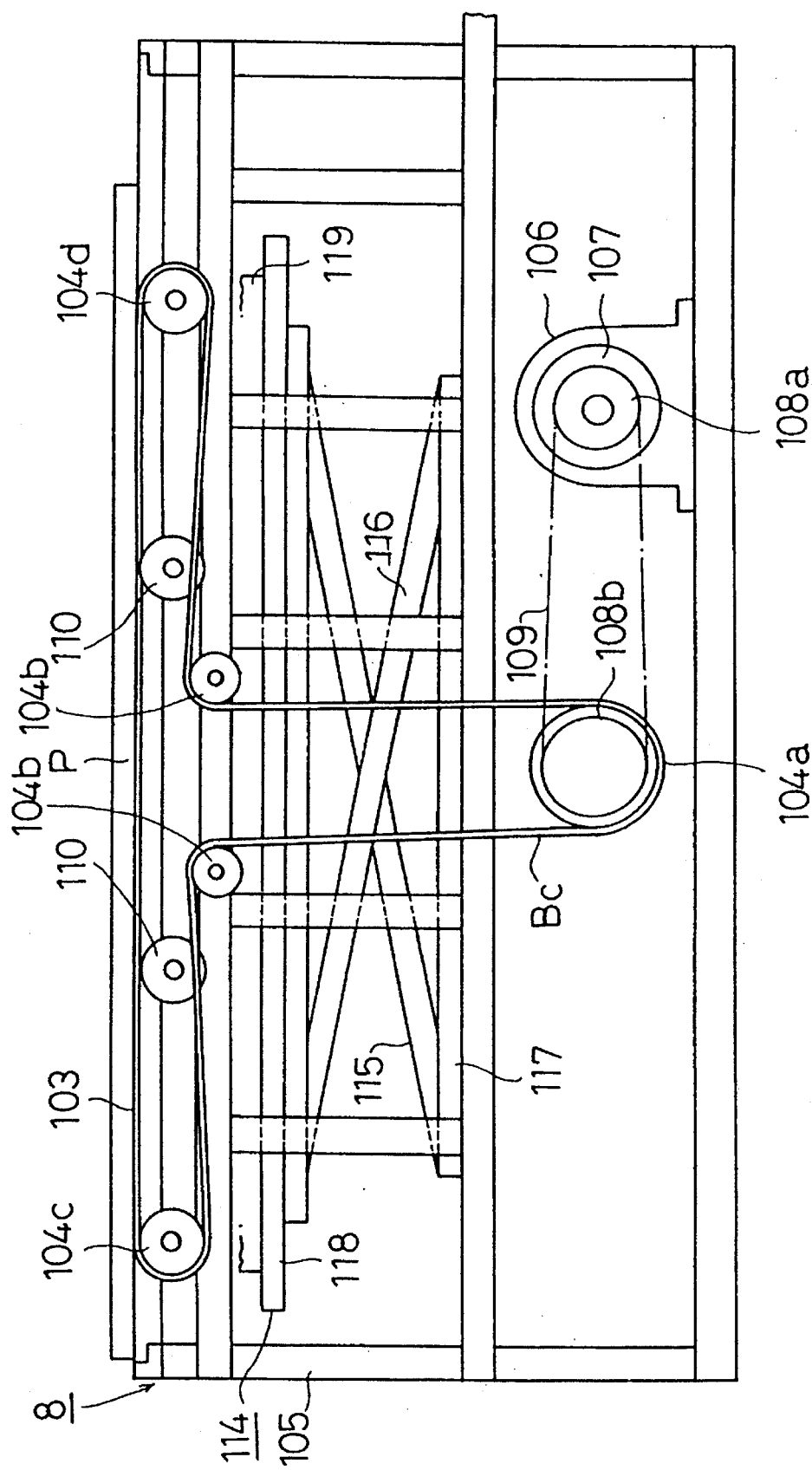
FIG. 17 is an enlarged front view of the setting station.
Figure 18:
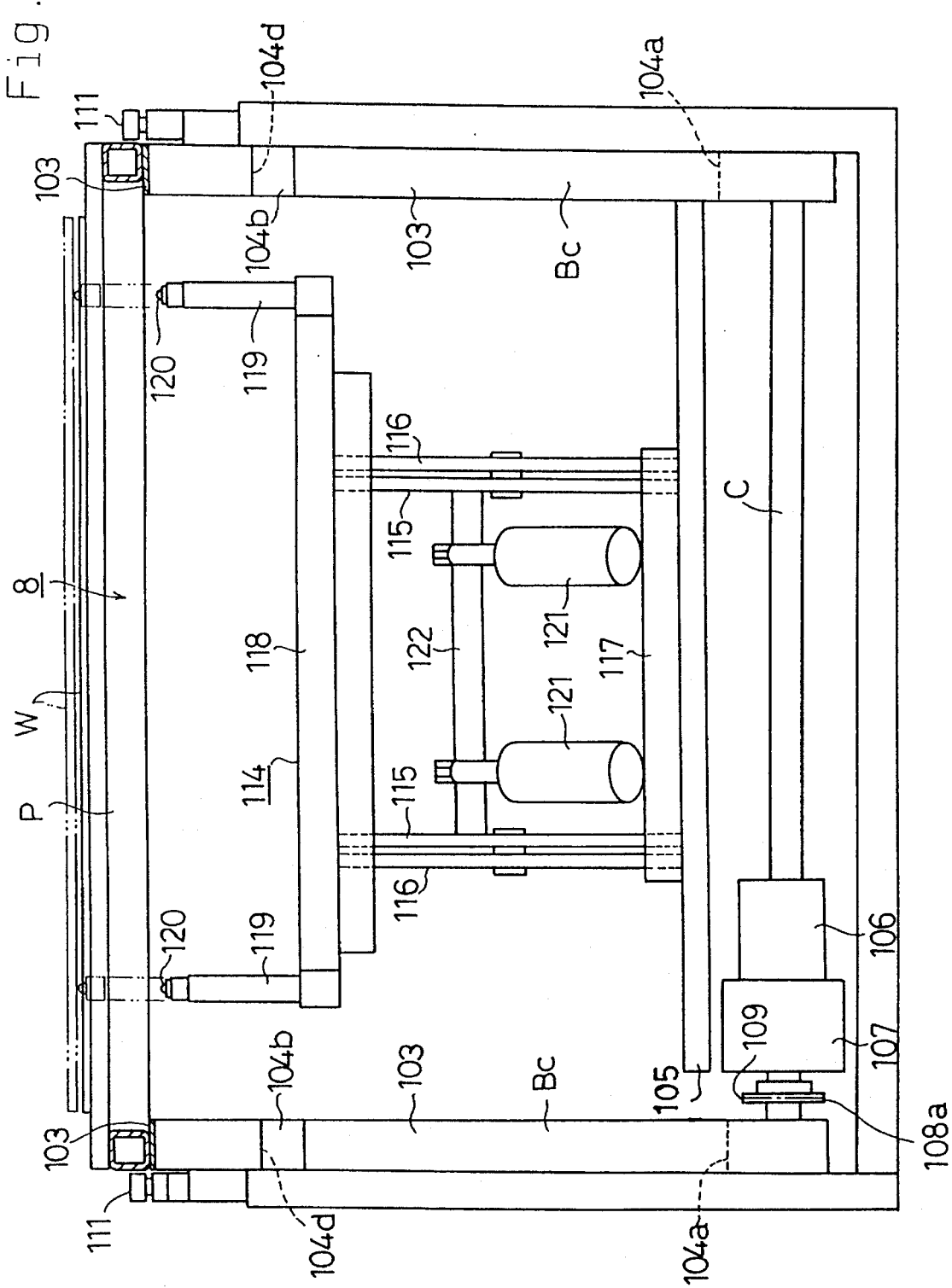
FIG. 18 is an enlarged side cross sectional view showing the setting station.

As shown in FIGS. 17 and 18, a lift device 114 is located at the inside of the frame 105. When the operations of mounting a workpiece W on or removing a workpiece W from the pallet P at the setting station 8 are conducted, the lift device 114 elevates the workpiece W from the top surface of the pallet P.

More specifically, two sets of paired operative legs 115 and 116 are located at the inner bottom portion of the frame 105, on a support board 117. A lift carriage 118 is supported on a top span defined between paired legs 115 and 116. A pair of lift bodies 119 upwardly protrude from the front and rear edges of the lift carriage 118. A plurality of balls 120 are rotatably located at the top distal portions of the lift bodies 119, which engage with the front and rear edges of the workpiece on the pallet P from the bottom side.

A pair of lift cylinders 121 are located on the support board 117. Piston rods are connected with the inner portions of the operative legs 115 respectively. When the lift carriage 118 is lifted from the position indicated by a solid line in FIG. 18, according to the actuation of the cylinder 121 as indicated by a broken line, the workpiece W is lifted by a predetermined amount from the top surface of the pallet P as the balls 120 engage with bottom surface of the workpiece W. Unclamping of the workpiece W with the pallet P is executed by supplying air to the clamp device 130. The air supply E2 connected to the air supply passage 136 is located at the front portion of the setting station 8. When the pallet P is transported to the setting station 8, the air supply E2 confronts with the air inlet 137a. The air supply E2 is similar to the air supply E1 at the intermediate transport station 2.

Figure 24:
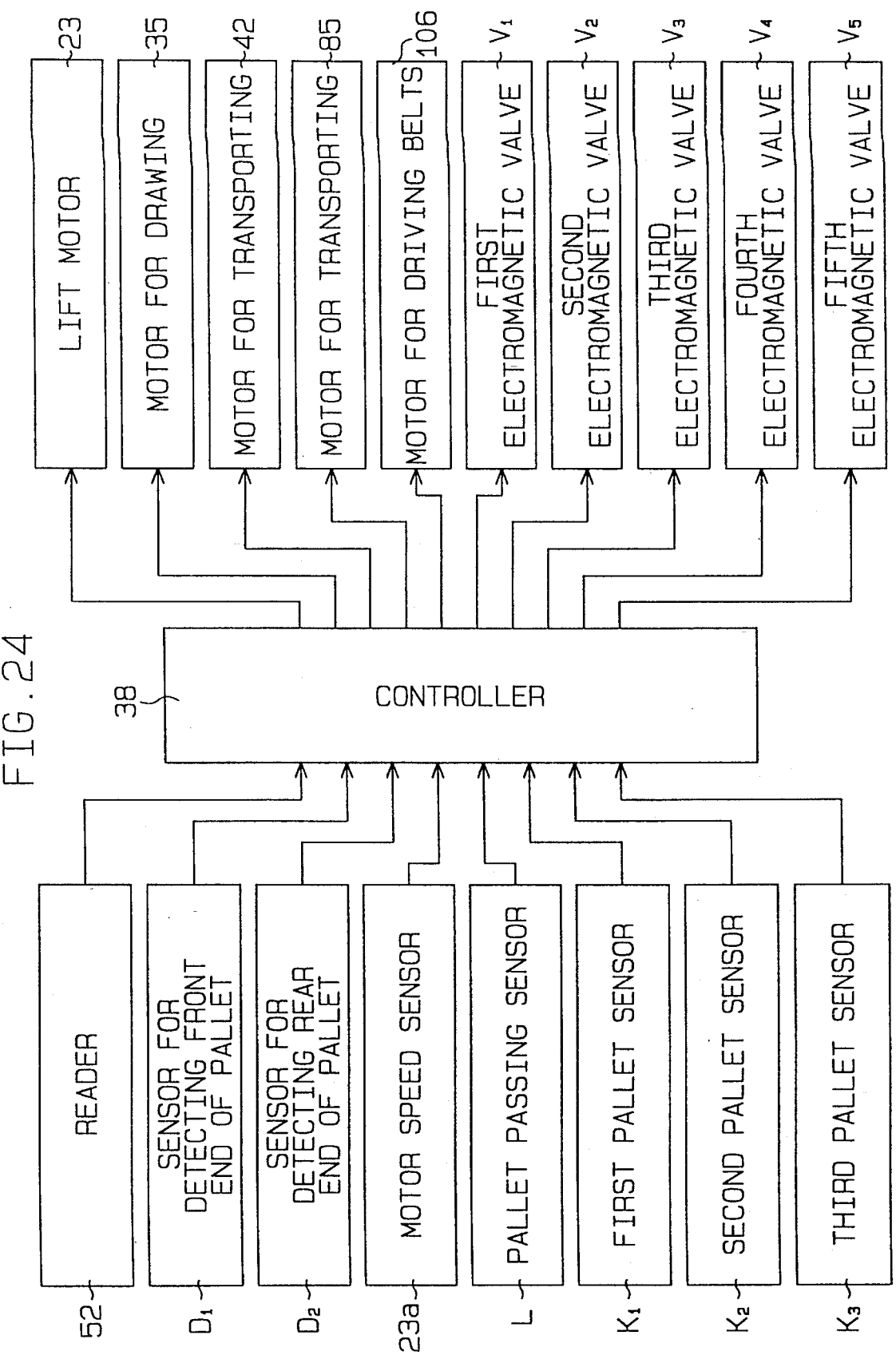
FIG. 24 is a block diagram showing the electrical configuration according to this embodiment.

The electrical configuration according to the present invention will now be described referring to FIG. 24. First, the electrical configuration at the input side of the controller 38 will be described. The reader 52 reads the memory medium 51 placed on a pallet P (FIG. 1). The operation for a workpiece W supported on the pallet P and the operation for the machined workpiece W will be executed according to control programs stored in the memory medium 51.

A sensor D1 (FIG. 4) transmits a detection signal to the controller 38 when the sensor D1 detects the front end of the pallet P as it reaches the fully drawn position. A sensor D2 transmits a detection signal to the controller 38 when the sensor D2 detects the pallet P is at the fully rearward position on the support arm 12. A motor speed sensor 23a detects the number of revolutions of the lift motor 23 and transmits a detection signal according to the detected value.

The first pallet sensor K1 transmits a detection signal to the controller 38 when the pallet P is accurately positioned at the place which corresponds to the storing position for the stocker 1 on the intermediate transport station 2. The pallet passing sensor L transmits a detection signal to the controller 38 when the pallet P is transported from the intermediate station 2 to the secondary transport device 5. A second pallet sensor K2 transmits a detection signal to the controller 38 when the pallet P is accurately positioned at the place which corresponds to the machining stand-by position on the work table 81 in the work station 4. A third pallet sensor K3 transmits a detection signal to the controller 38 when the pallet P is accurately positioned at the predetermined position on the setting station 8.

Figure 25:
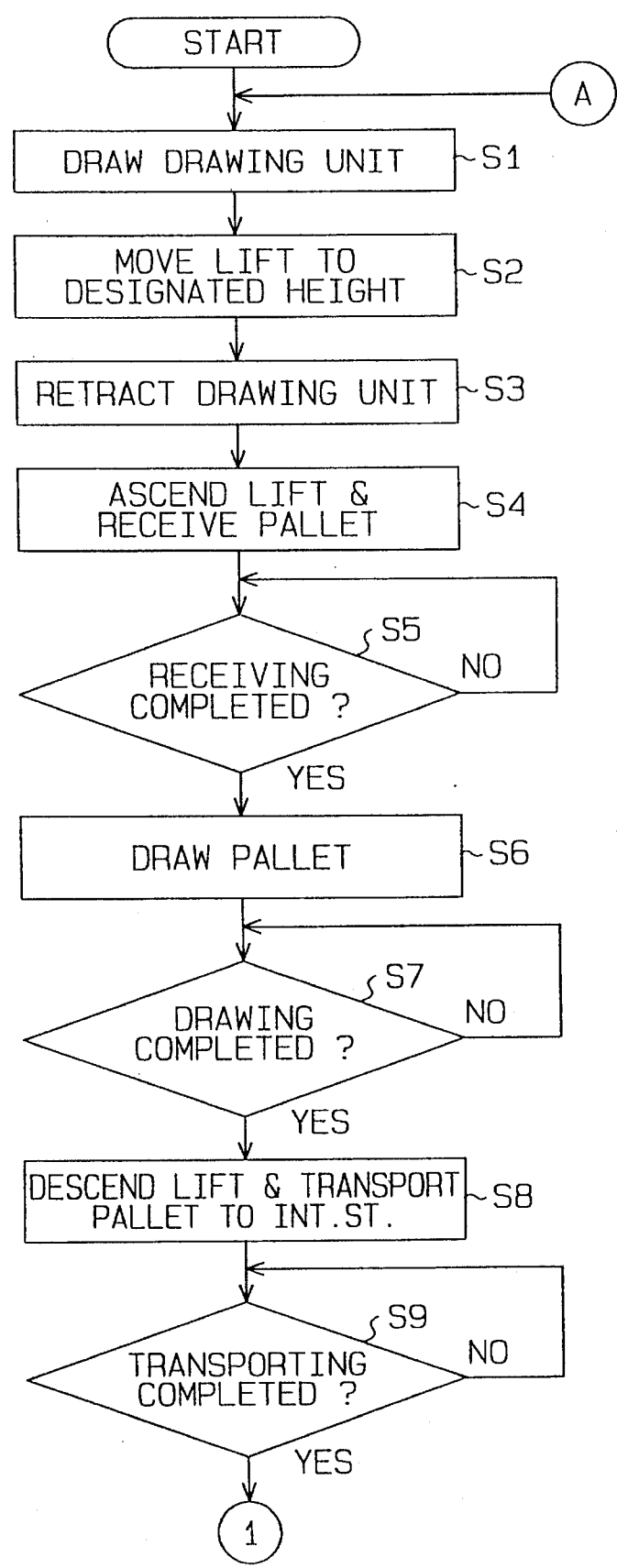
FIG. 25 is a flowchart showing the operation of a controller under unmanned operation.
Figure 25:
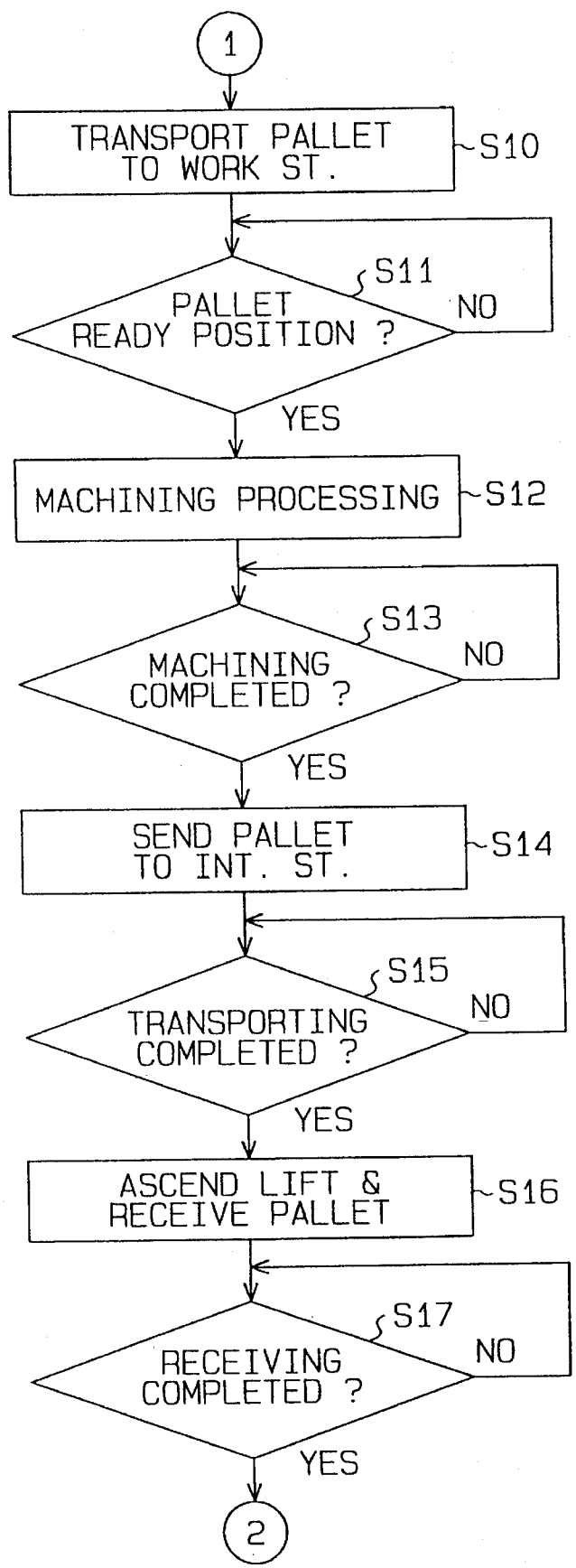
Figure 25:
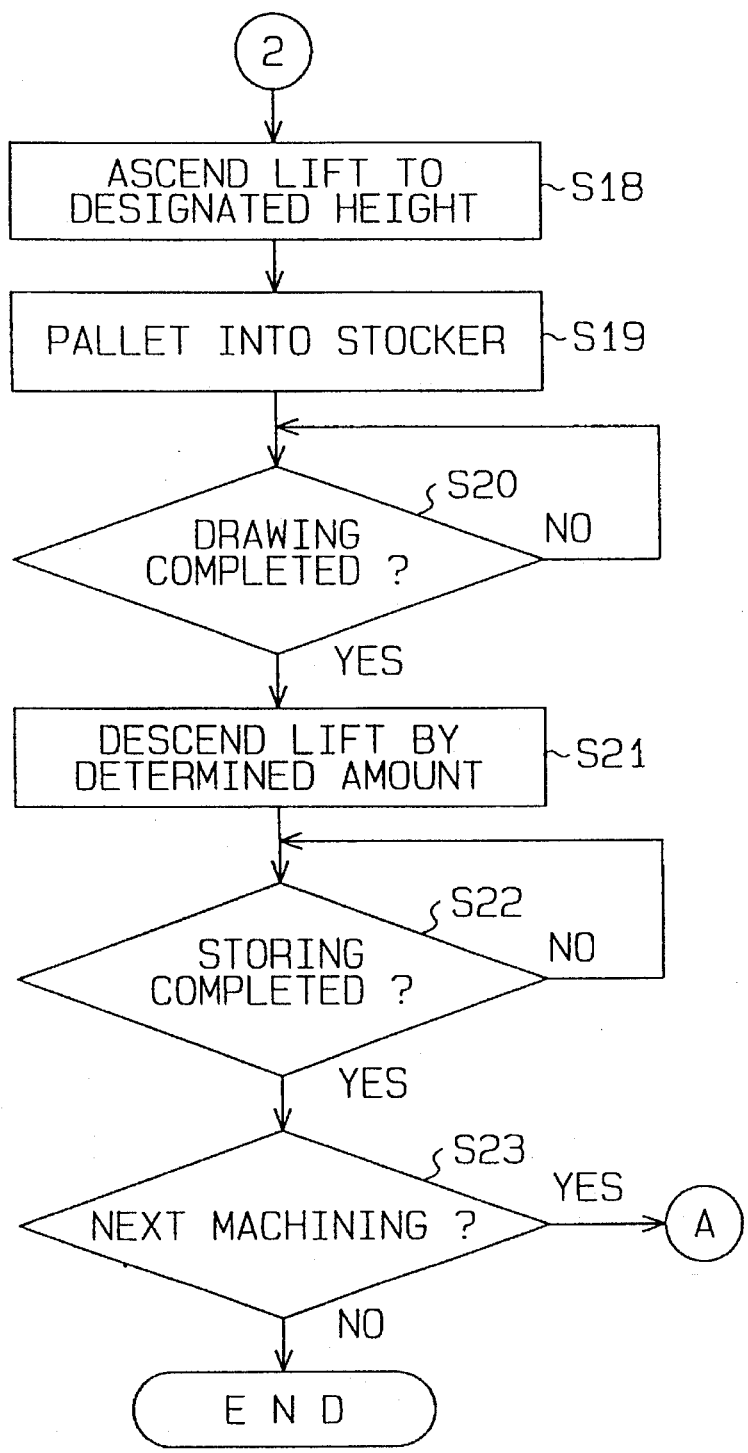
Figure 26:
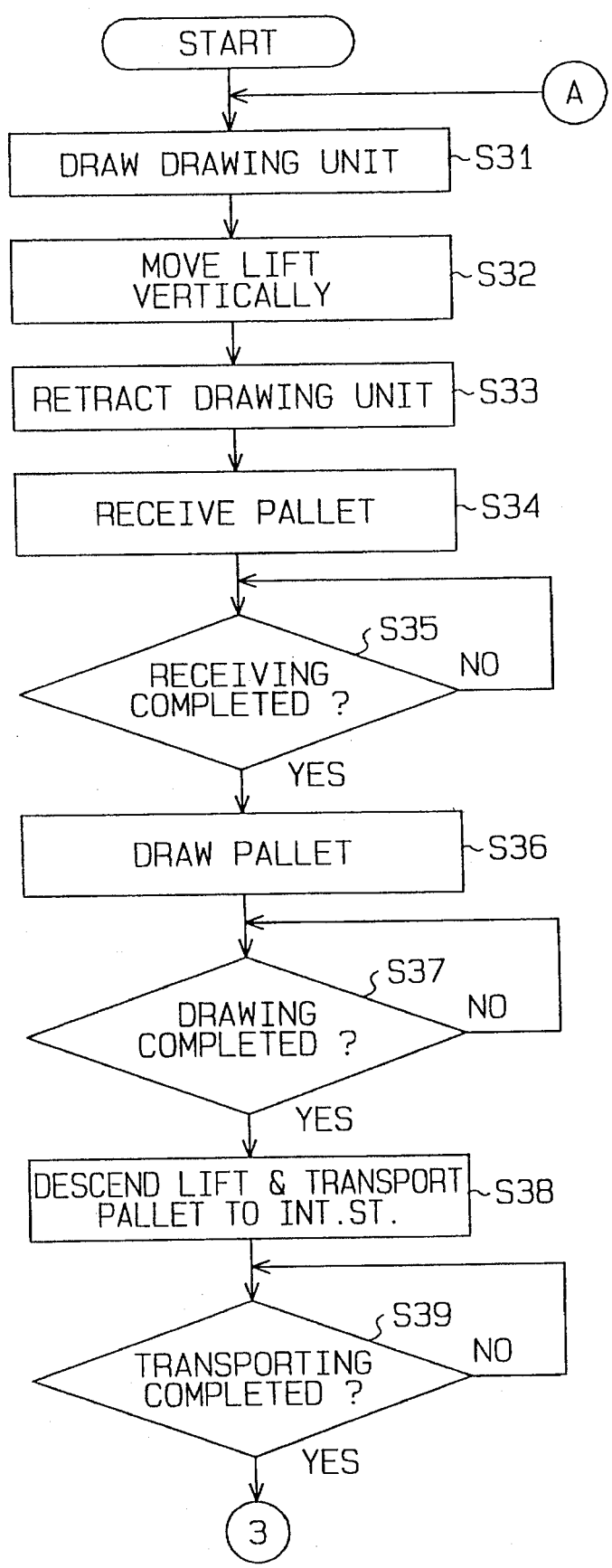
FIG. 26 is a flowchart showing the operation of the controller under manned operation.
Figure 26:
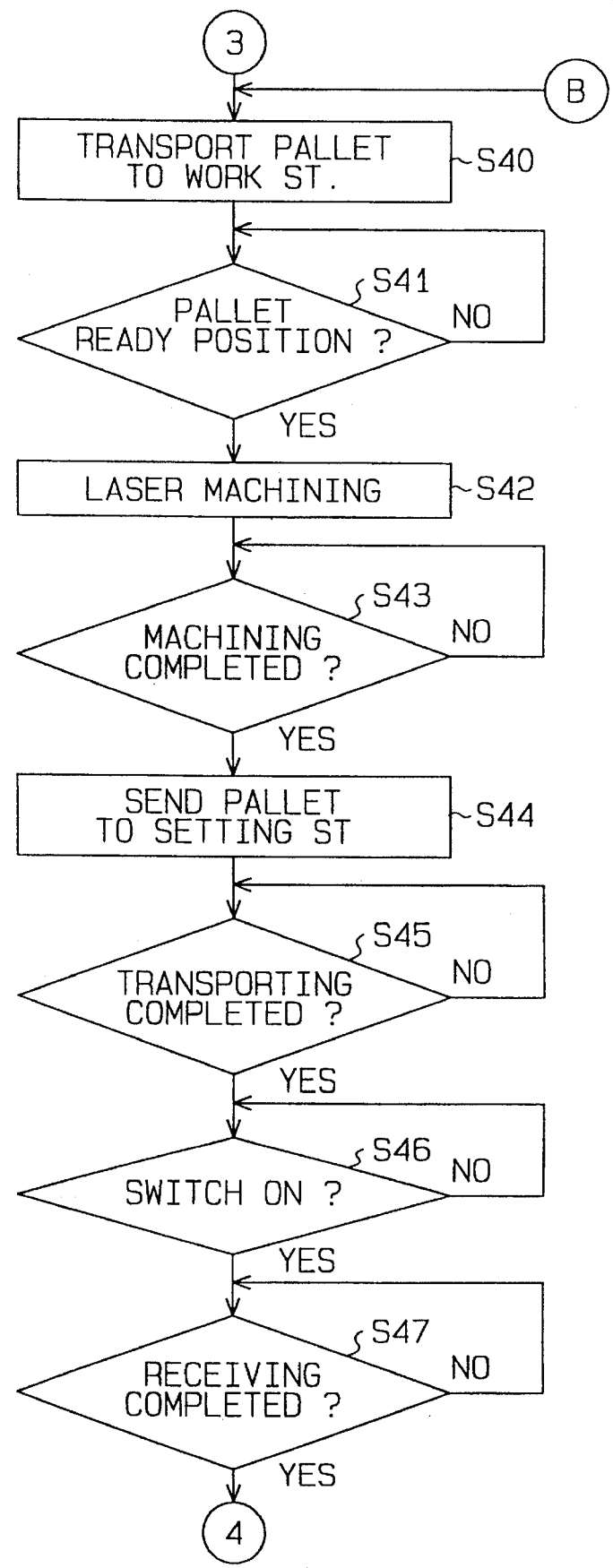
Figure 26:
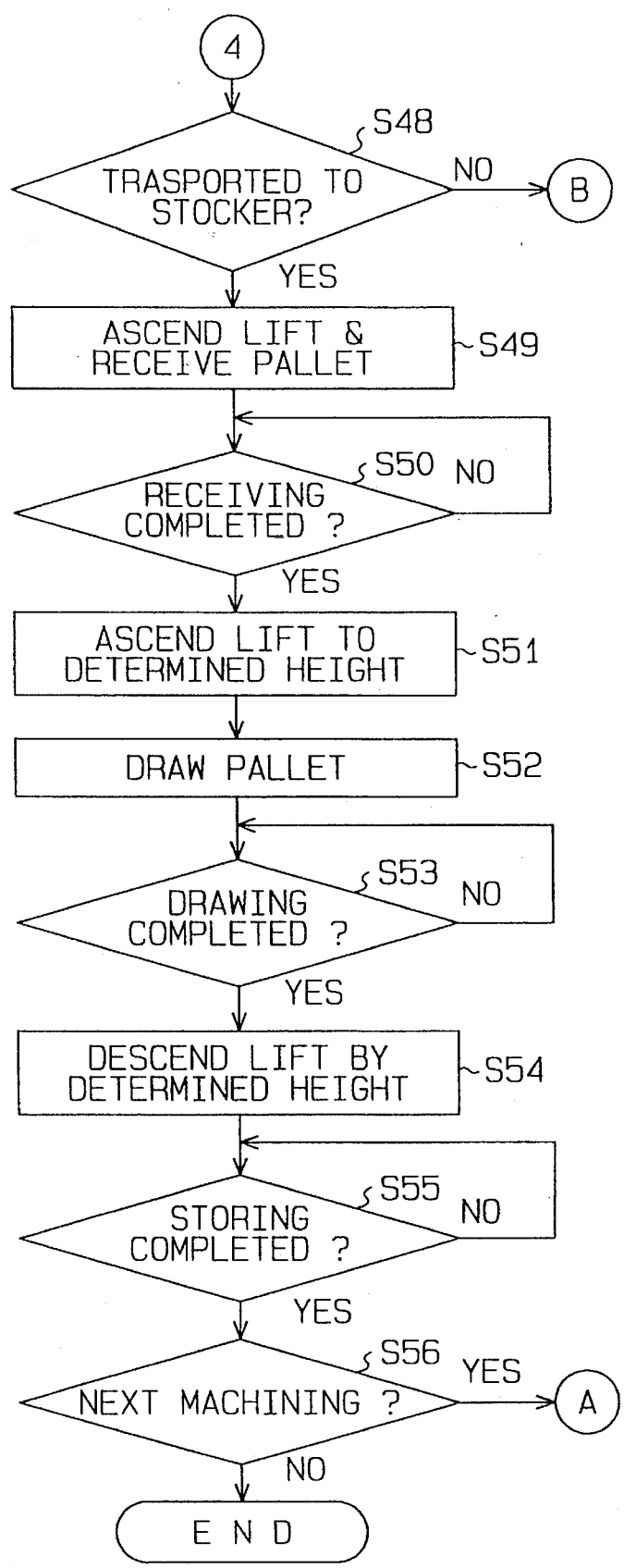

The electrical configuration at the output side of the controller 38 will be described, referring to FIG. 24, together with the flowchart in FIG. 25, which explains the operational steps.

When the pallet P is to be drawn out from the stocker 1 to the intermediate transport station 2, the controller 38 drives the motor 35 such that the drawing unit 29 is drawn out of the stocker 1 (step S1). The controller 38 drives the motor 23 such that the lift 14 is vertically moved to the designated height, either upwardly or downwardly, which corresponds to the position of the pallet P (step S2). The controller 38 drives the motor 35 such that the drawing unit 29 is inwardly moved to the position just under the selected pallet P (step S3). When the lift 14 moves vertically, the controller 38 drives the motor 23 and calculates the position or height of the lift 14 from time to time, according to the number of revolutions of the motor sent from the sensor 23a, to draw out the selected pallet P. The controller 38 causes the lift 14 to ascend to the predetermined height. In the mean time, the pallet P is slightly lifted from the support arms 12 by means of the drawing unit 29 (step S4). The controller 38 confirms the receipt of the pallet P by the drawing unit 29 according to the detection signal transmitted from the sensor D2 (step S5). The controller 38 drives the motor 38 such that the pallet P is drawn out from the stocker 1 (step S6). The controller 38 confirms the completion of the drawing operation according to the detection signal transmitted from the sensor D1 (step S7).

The controller 38 drives the motor 23 such that the lift 14 descends to the lowermost position in order to transfer the pallet P onto the intermediate transport station 2. In this manner, the pallet P is drawn out from the stocker 1 to the intermediate station 2 (step S8). The controller 38 confirms the completion of the drawing operation according to the detection signal transmitted from the first sensor K1 (step S9). The controller 38 drives the motor 42 such that the belt conveyers 39 are rotated to transport the pallet P to the work station 4 (step S10).

The controller 38 prepares to execute laser beam machining according to the detection signal transmitted from the sensor L. More specifically, the controller 38 activates a first electromagnetic valve V1 so as to activate the urging cylinder 67, and a second electromagnetic valve V2 so as to activate the urging cylinder 74. By these activations, the pallet P is securely transferred from the conveyers 39 and 55 to the work table 81. The controller 38 activates a third electromagnetic valve V3 so as to drive the cylinder 95 to determine the position in the width direction on the work table 81. Simultaneously, the controller 38 activates a fourth electromagnetic valve V4 so as to drive the cylinder 94. Therefore, the pallet P is moved to the predetermined location on the work table 81 by means of the hooks 92, and is kept at the machining preparation position.

The controller 38 confirms that the pallet P is at the machining preparation position according to the detection signal transmitted from the second sensor K2 (step S11). The controller 38 activates the laser beam machine 6 to apply the laser to the workpiece W placed on the pallet P by driving the motor 85 for the X axis, and motors for the Y and Z axes (not shown) according to the pre-stored machining program (step S12). When the laser beam machining is completed (step S13), the controller 38 deactivates the third and fourth electromagnetic valves V3 and V4 to release the pallet P.

The controller 38 drives the motor 42 in the reverse direction and, simultaneously, activates a fifth electromagnetic valve V5 such that the rod of the cylinder 99 is protruded to push the pallet P toward the intermediate transport station 2. Therefore, the pallet P is transported to the intermediate station 2 (step S14). The controller 38 confirms that the transport of the pallet P is completed according to the detection signal transmitted from the first sensor K1 (step S15). The controller 38 activates the motor 23 and 35 to drive the drawing unit and lift in order to restore the pallet P supporting the machined workpiece W to the original position in the stocker 1 (steps S16 through S21). The controller 38 confirms that the pallet restoring operation is completed according to the detection signal transmitted from the sensor D2 (step S22). When a successive machining operation is required at step S23, the controller 38 returns to step S1 to repeat the same operation. In the above-described manner, all steps can be automated.

When an operator is going to manually remove the machined workpiece W at the setting station 8, the pallet P is transported from the work station 4 to the setting station 8 via the intermediate transport station 2. In the flowchart shown in FIG. 26, the controller 38 executes the operations at steps S31 through S43 similar to those of steps S1 through S13. As the motors 42 and 106 are simultaneously activated upon completion of the machining operation, the pallet P is transported from the work station 4 to the setting station 8 via the intermediate station 2 (step S44).

When the pallet P reaches the predetermined position on the setting station 8, the third sensor K3 detects arrival of the pallet P and transmits a detection signal to the controller 38 (step 45). After the operator removes the machined workpiece W from the pallet P by hand or by manipulating a crane (not shown) and replaces it with a new workpiece W, the operator manipulates a switch for indicating the completion of the replacement operation. A signal is transmitted from the switch to the controller 38 (step S46). The controller 38 confirms that the pallet transfer at the intermediate transfer station 2 has been completed (step S47). The controller determines whether the pallet P should be transported to the stocker 1 or work station 4 according to the program (step S48). When the pallet P is to be stored into the stocker 1, the controller executes the pallet storing operation at steps S49 through S54. On the other hand, when the pallet P is to be directly transferred from the setting station 8 to the work station via the intermediate station 2, the controller 38 shifts its operation to step S40.

Figure 27:
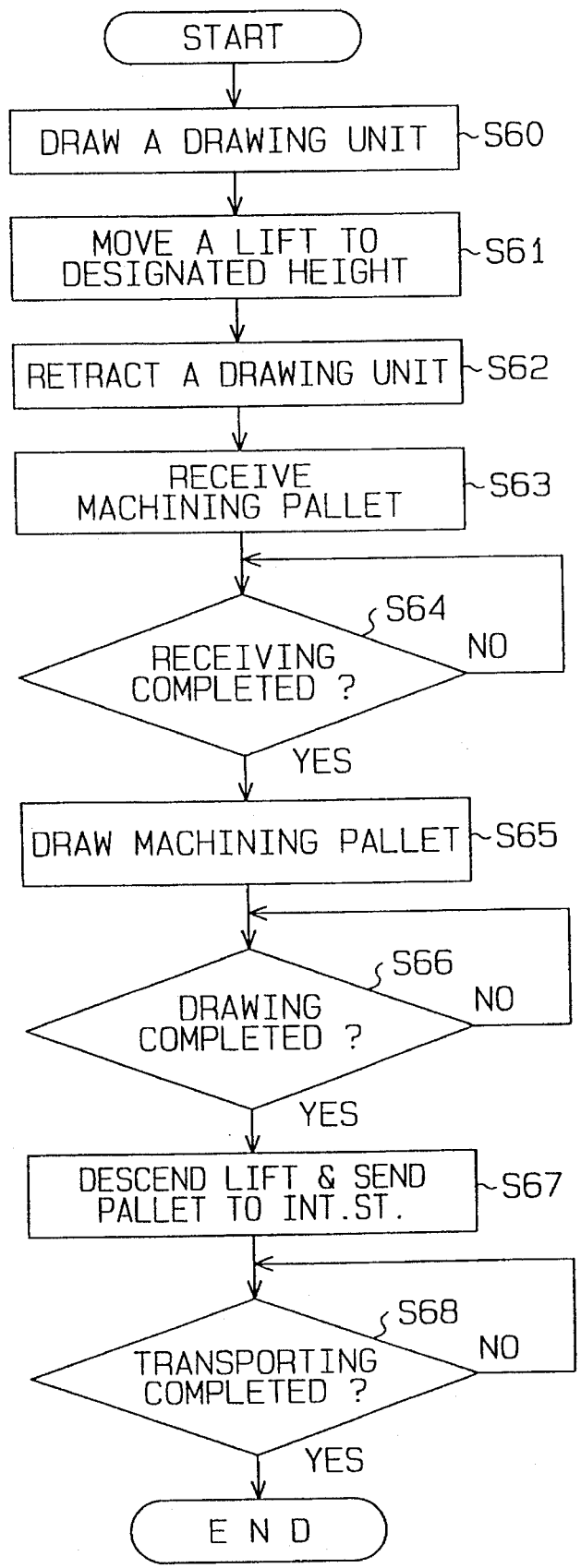
FIG. 27 is a flowchart showing an interruption program indicated in FIG. 26.
Figure 28:
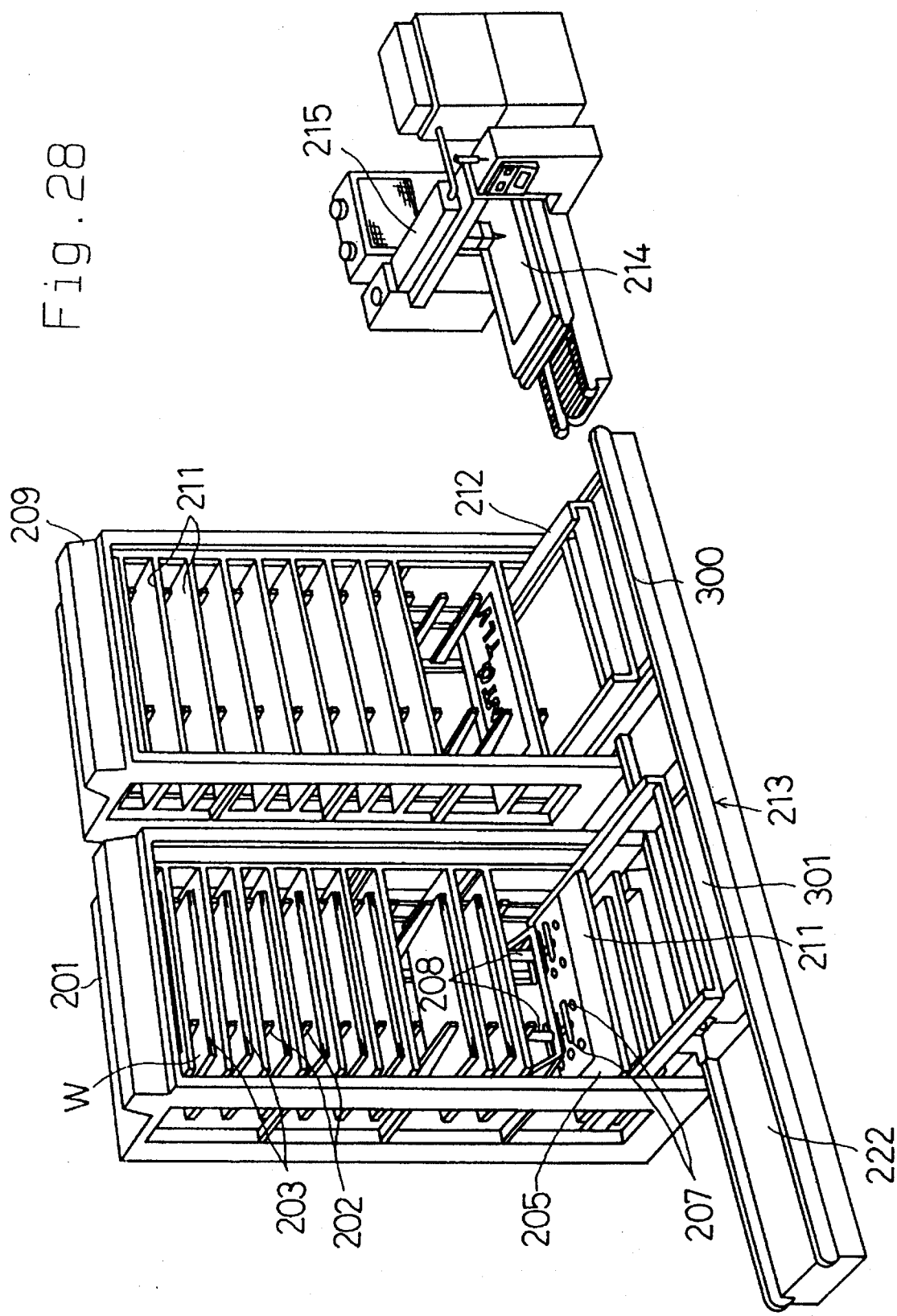
FIG. 28 is a perspective view showing a laser beam machining device according to a second embodiment of the present invention.
Figure 30:
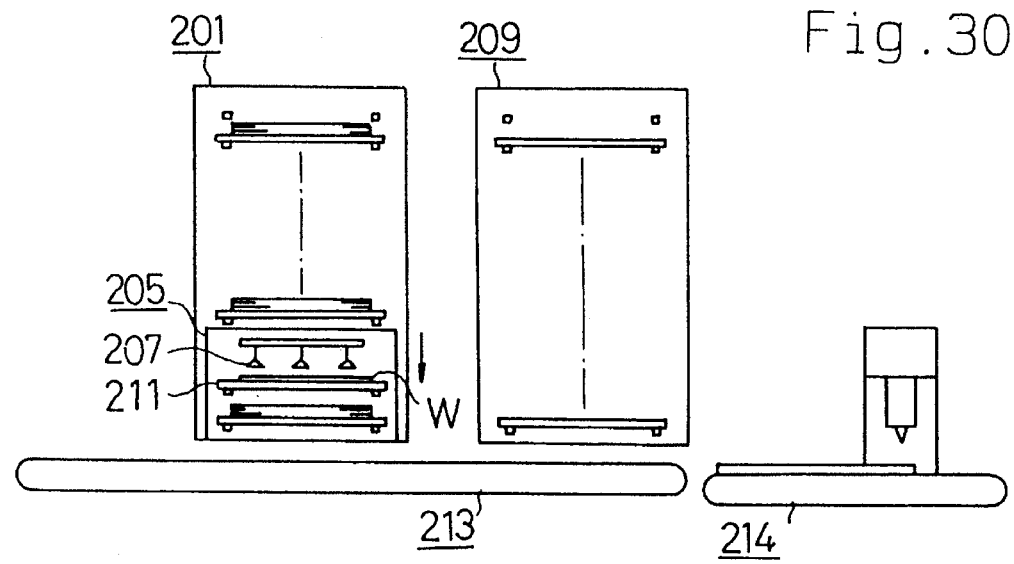
FIGS. 30(a) through 30(c) are explanatory diagrams showing the consequential operations for the workpiece following FIGS. 29a–c.
Figure 30:
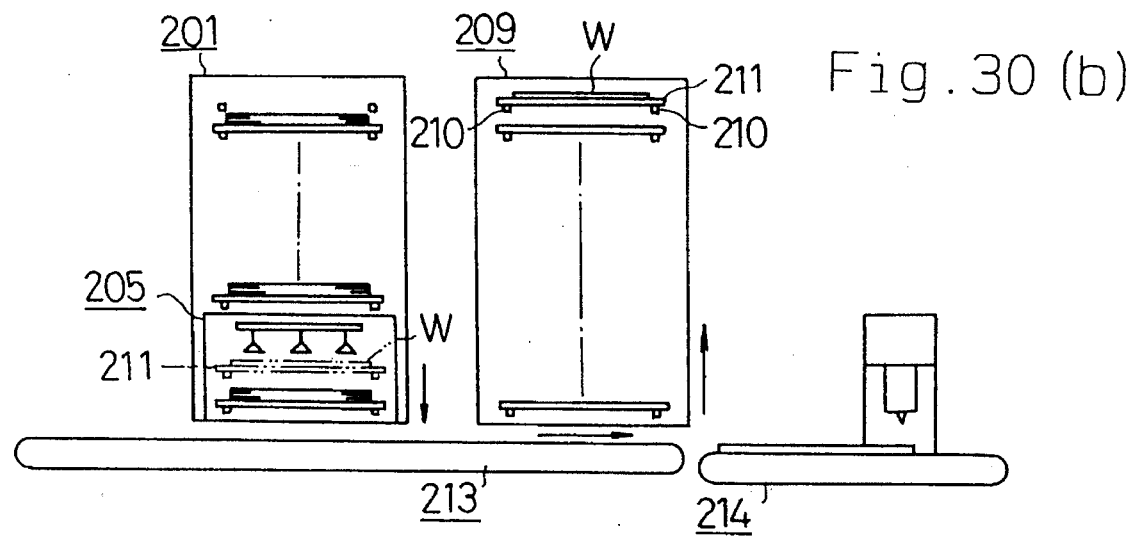
Figure 30:
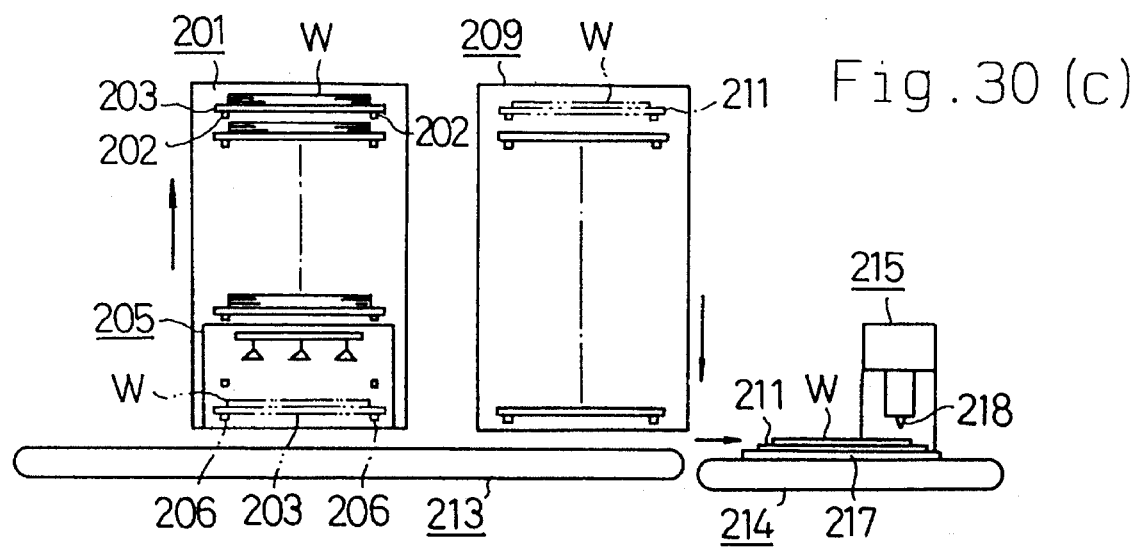

During the execution of the above-described steps, the controller 38 is designed to interrupt with another routine. More specifically, as shown in FIG. 27, in a routine to draw out the pallet P supporting the workpiece W to be machined next from the stocker 1 to the intermediate station 2, the controller 38 executes the operations of steps S60 through S67, similar to those of steps S31 through S39. Thus, the pallet P supporting the workpiece W to be machined next can be drawn out to the intermediate station 2 during laser beam machining.

The movement in the laser beam machining device under the operational mode, which the setting station 8 also uses, will now be described referring to the movement of the pallet P.

Figure 19:
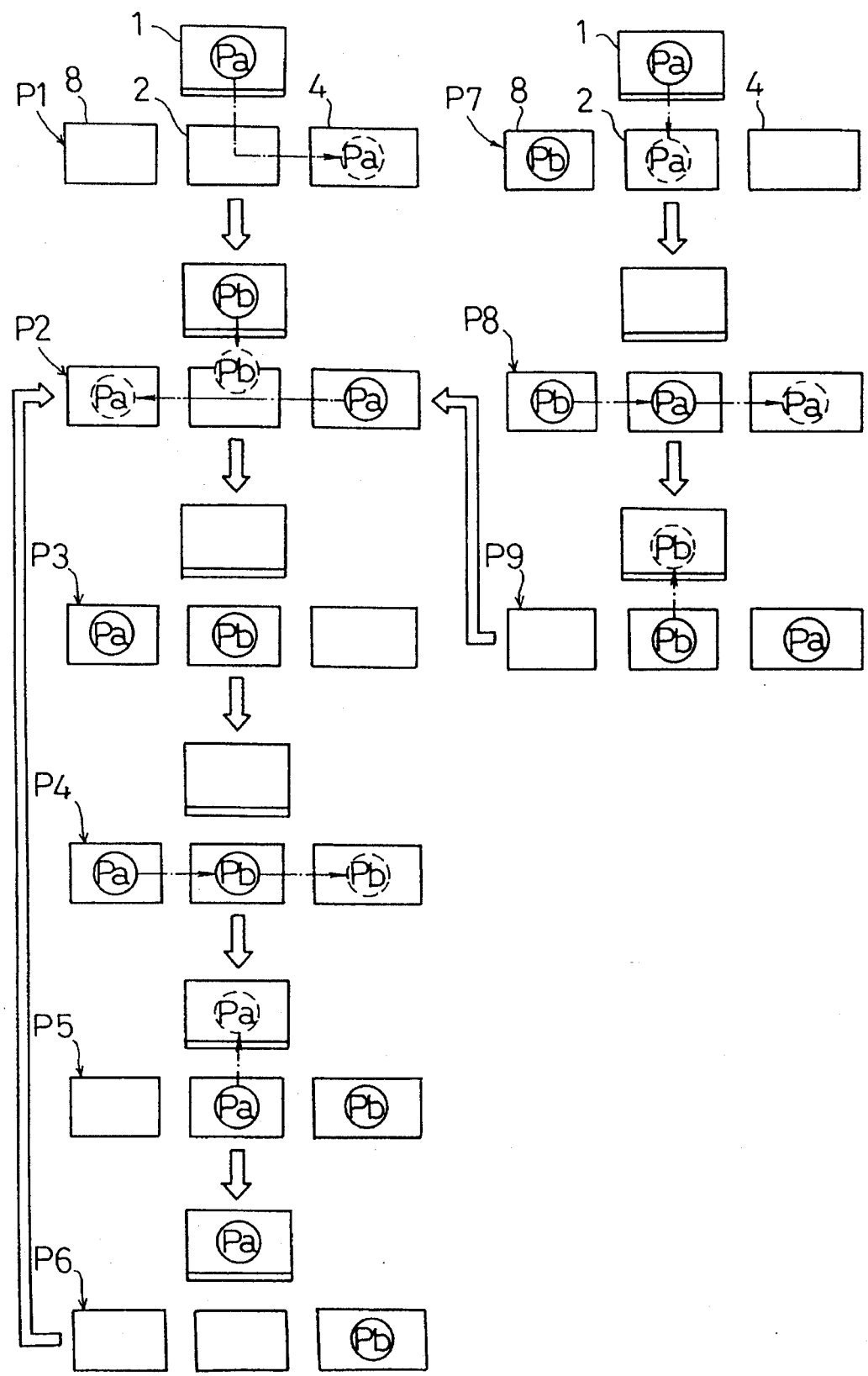
FIG. 19 is an explanatory diagram showing the transporting sequence of the pallets under unmanned operation.

As shown in FIG. 19, a plurality of the pallets supporting workpieces W are stored beforehand in the stocker 1. More specifically, after a pallet Pa supporting a first workpiece W is drawn out from a certain shelf of the stocker 1 and placed on the intermediate transport station 2, the pallet Pa is transported from the intermediate station 2 to the work station 4. The first workpiece W is machined by the laser beam machine 6 at the work station 4 (progress P1). While the first workpiece W is being machined, a pallet Pb supporting a second workpiece W is drawn out from the stocker 1 and kept at a stand-by position above the intermediate station 2. After the machining operation of the first workpiece W is completed, the pallet Pa supporting the machined first workpiece W is transported from the work station 4 to the setting station 8, via the intermediate station 2 (P2).

The pallet Pb at the stand-by position is placed on the intermediate station 2 by the pallet transport device 3 and is then transported from the intermediate station 2 to the work station 4. Simultaneously, the pallet Pa supporting the machined workpiece W is transported from the setting station 8 to the intermediate station 2 (P3 and P4). In this condition, laser beam machining is done to the second workpiece W supported on the pallet Pb at the work station 4. Simultaneously, the pallet Pa supporting the machined workpiece W is to be stored in a certain shelf within the stocker 1 from the intermediate station 2 (progresses P5 and P6).

The controller 38 returns to progress P2 and repeatedly executes the operations of progresses P2 through P6. Therefore, pallets P supporting unmachined workpieces W stored in the stocker 1 are transported to the work station 4 one after another. Each pallet P supporting a processed workpiece W is stored in the stocker 1 in sequence.

The transport operation of the workpiece W into/from the work station 4 can be automatically executed. Therefore, the laser beam machining device can be operated in an unmanned mode during the night to increase productivity. Even if the types of workpieces W on the pallets P stored in the stocker 1 and their machining conditions differ from one another, each workpiece W is automatically machined according to the specified conditions which are stored in the memory medium 51 of the respective pallet P and are read by the reader 51 located on the intermediate station 2. Further, since a plurality of pallets P supporting workpieces W are stored vertically in the stocker 1. The installation space of the device is reduced.

As shown in progresses P7 through P9 of FIG. 19, the transport operation of the workpiece W into/from the work station 4 can be automatically executed while the operations of mounting a new workpiece W to the pallet P and removing the precessed workpiece W therefrom are executed at the setting station 8. Therefore, the machining operation of a number of workpieces W can be continuously carried out.

In other words, when the pallet Pa supporting the first workpiece W is drawn out from the stocker 1 onto the intermediate transport station 2 by means of the pallet transport device 3, the second workpiece W can be mounted onto the pallet Pb at the station 8 (progress P7). The pallet Pa supporting the first workpiece W is transported from the intermediate station 2 to the work station 4. Simultaneously, the pallet Pb supporting the second workpiece W is transported from the setting station 8 to intermediate station 2 (progress PS). Laser machining is done to the first workpiece W on the pallet Pa. Simultaneously, the pallet Pb supporting the second workpiece W is transported and stored in a predetermined shelf in the stocker 1 by means of the pallet transport device 3 (progress P9).

The operations of progresses P2 through P6 are repeatedly executed. The pallets P supporting unmachined workpieces W are continuously transported into the work station 4 one after another, and laser machining is done to the transferred workpieces W in sequence. Furthermore, at progress P3, every time a pallet P supporting a machined workpiece W is transported into the setting station 8, the machined workpiece W is removed from the pallet P and an unmachined workpiece is installed. Therefore, according to this machining method, the operation of mounting and removing the workpiece W can be executed at a single place. A greater number of workpieces W than that of the stored workpieces W in the stocker 1 can be smoothly machined in sequence. As a result, productivity can be improved.

Figure 20:
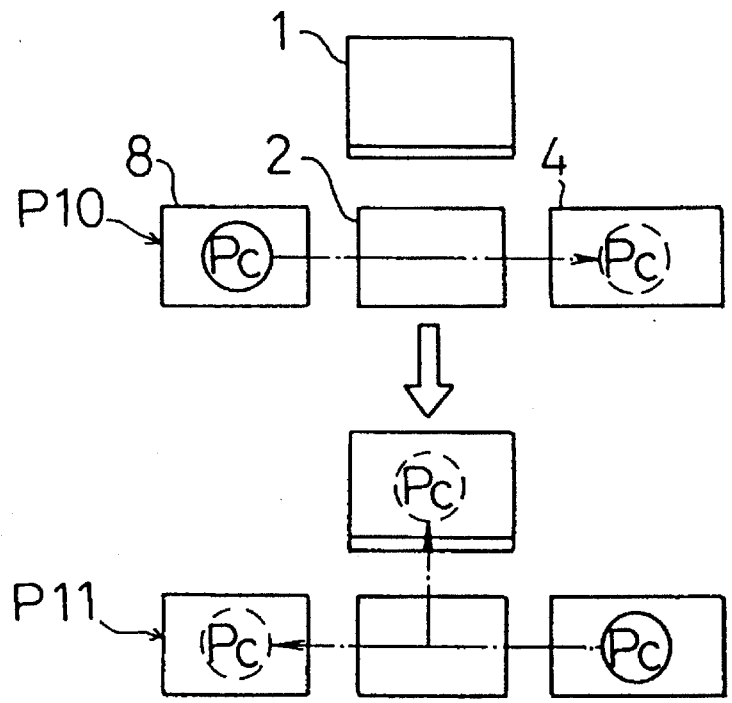
FIG. 20 is an explanatory diagram showing the transporting sequence of the pallets under manned operation.
Figure 21:
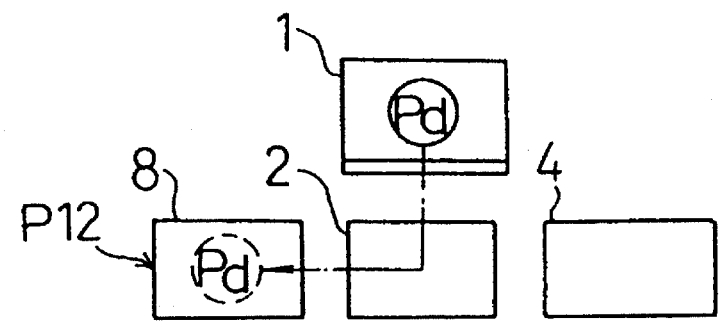
FIG. 21 is an explanatory diagram showing transporting sequence of the pallets under manned operation.

When laser beam machining is executed while mounting or removing workpieces W at the setting station 8, pallets P are transported in sequence as indicated in FIGS. 20 and 21.

In progresses P10 and P11 shown in FIG. 20, a pallet Pc holding an unmachined workpiece W at the setting station 8 is transported to the work station 4 via the intermediate transport station 2. After laser machining the workpiece W on the pallet Pc, the pallet Pc supporting the machined workpiece W is transported from the work station 4 to the setting station 8 via the intermediate station 2 or stored into the stocker 1 via the intermediate station 2. In progress P12 of FIG. 21, after a pallet Pd is drawn out from the stocker 1 and placed on the intermediate station 2 by the pallet transport device 3, the pallet Pd is transported to the setting station 8.

Therefore, by combining the operations described in FIGS. 20 and 21 with that of FIG. 19, pallets P can be freely transported among the stocker 1, work station 4 and setting station 8. Thus, laser beam machining can be efficiently executed.

After the laser beam machining is applied, cut-off portions of the workpiece W will remain on the pallet P. A connecting portion of the workpiece W (a micro joint) is no longer required. Therefore, handling of the machined workpiece W is simplified.

The second embodiment according to the present invention will now be described referring to FIGS. 28 through 36.

According to this embodiment, pallet storing means is formed by a temporary stocker 209 for storing a work pallet 211 supporting a workpiece W. The pallet 211 is transported to a work station 214, via an intermediate transport station 300. A plurality of material pallets 203, which are not directly related to the laser beam machining, are removably supported on support arms 202 in a material stocker 201 for supplying workpieces W. A plurality of workpieces W having a plane shape are separated by type of material, size and thickness, etc., are placed one on top of another on each material pallet 203 according to their type. The pallets 203 are transported from the stocker 201 to the intermediate station 300 located at the front of the stocker 201 by means of a pallet transport device 204. The pallets 203 may also be transported in a reverse direction.

An setting station 205 is located at the lowest shelf within the material stocker 201. A selected material pallet 203 is transported to the setting station 205 from the material stocker 201 by means of the pallet transport device 204. The setting station 205 includes a pallet support base 206 for supporting the material pallet 203, a vacuum adhesion device 207 for adhering a sheet of workpiece W by suction to the top of the material pallet 203, and a pair of cylinders 208 for vertically moving the vacuum adhesion device 207. A sheet workpiece W is picked up from the top of the material pallet 203 by means of the vacuum adhesion device 207 and is fitted on the work pallet 211, which will be described below.

On the other hand, the temporary stocker 209 is located in the vicinity of the material stocker 201. A plurality of work pallets 211, which carry either un-machined workpieces W, machined workpieces W or are empty, are stored in the vertically constructed shelves of the support arms 202. The work pallet 211 is transported to or from the intermediate station 300 by means of a pallet transport device 212 located at the inside of the temporary stocker 209.

The intermediate transport stations 300 and 301 are formed by a belt conveyer 213, which is located at the front of the material stocker 201 and temporary stocker 209 and extends in a direction along the material stocker 201 and temporary stocker 209. An empty work pallet 211 drawn from the temporary stocker 209 is transported to the front of the material stocker 201 and to setting station 205 by means of the pallet transport device 204. After a work pallet 211, on which the workpiece W is mounted, is frontwardly transported by the pallet transport device 204, the pallet 211 is transported to the front of the temporary stocker 209 by the belt conveyer 213. The pallet 211 is then stored in the temporary stocker 209 by the pallet transport device 212. Further, the work pallet 211 supporting a machined workpiece W is transported to the intermediate transport station 300 by the belt conveyer 213, and is stored into the temporary stocker 209 by the pallet transport device 212.

Furthermore, at a setting station 222, an un-machined workpiece W can be supplied to the material pallet 204 transported from the material stocker 201 or a machined workpiece W can be removed from a work pallet 211 transported from the temporary stocker 209.

The operation of a laser beam machining system, which has the above-described configuration, will now be described.

In this laser beam machining system, a plurality of plane shape workpieces W are previously separated and stored one on another in a pile on the material pallets 203 by kind, size and machining method, etc., at the setting station 222. Then, the pallets 203 are stored in the vertically constructed shelves of the material stocker 201 via belt conveyer 213 and pallet transport device 204. As shown in FIG. 29(a), when the laser machining system is in operation, the material pallet 203, supporting a certain type of workpieces W, is drawn out from the material stocker 201 by the pallet transport device 204 and is placed on the pallet support base 206 of the setting station 205. At this time, the vacuum adhesion device 207 is moved over the material pallet 203 by means of the cylinder 208.

In this condition, as shown in FIG. 29(b), the vacuum device 207 in the setting station 205 is lowered to the workpiece W and a sheet of workpiece W on the material pallet 203 is adhered to the vacuum adhesion device 207. The vacuum adhesion device 207 with the workpiece W is lifted to the original position. Then, as shown in FIG. 29(c), a certain work pallet 211 is drawn out from the temporary stocker 209 by means of the pallet transport device 212 and transported to the front of the material stocker 201 by the belt conveyer 213. Then, it is placed in the setting station 205, which is located underneath the vacuum adhesion device 207.

As shown in FIG. 30(a), the vacuum adhesion device 207 of the setting station 205 is lowered and its suction is halted. Therefore, the sheet workpiece W is released from the vacuum adhesion device 207 and placed on the work pallet 211. After that, the vacuum adhesion device 207 is lifted to the original position. In this condition, as shown in FIG. 30(b), the work pallet 211 supporting the workpiece W is moved from the setting station 205 by means of the pallet transport device 204. The work pallet 211 is transported to the front of the temporary stocker 209 by means of the belt conveyer 213 and is then stored in a certain shelf of the temporary stocker 209 by the pallet transport device 212.

As shown in FIG. 30(c), the work pallet 211 supporting a workpiece W is drawn out from the temporary stocker 209 by means of the pallet transport device 212 and is then transported to the work station 214 along the intermediate transport station 300 to the work table. After the work pallet 211 supporting the workpiece W is moved from the temporary station 205, it can be directly transported to a work table 217 of the work station 214 without storing it in the temporary stocker 209. These operational steps are preferably performed according to various conditions regarding time and order, etc.

As shown in FIG. 30(c), at the work station 214, laser beam machining is done to the workpiece W on the work pallet 211. After the laser beam machining is completed, the work pallet 211 supporting the machined workpiece W is transported to the front of the temporary stocker 209 along the intermediate station 300. Then, the work pallet 211 is stored into a certain shelf of the temporary stocker 209 by the pallet transport device 212.

When laser beam machining is to be continuous, the steps of FIGS. 29(b) and (c), and FIGS. 30(a) through (c) are repeatedly executed. When laser beam machining is to be done to the workpiece W carried on the material pallet 203 stored in the material stocker 201, as shown in FIG. 30(c), the pallet 203 in the setting station 205 is moved away from the setting station 205 by means of the pallet transport device 204 and stored in a certain shelf of the material stocker 201. Then, the steps similar to those in FIGS. 29(a) through (c) and FIGS. 30(a) through (c) are executed.

When the machining operation is carried out in this manner, and the number of the work pallets 211 supporting the machined workpieces W exceeds a predetermined number, or a predetermined period of time since the machining operation was initiated has elapsed, the work pallet 211 supporting the machined workpiece W is drawn out from the temporary stocker 209 by means of the pallet transport device 212. Then, the work pallet 211 is transported into the setting station 222, via intermediate transport stations 300 and 301. Therefore, the machined workpiece W can be removed from the work pallet 211 at the setting station 222.

As described above, those steps are set to achieve the most efficient productivity.

Another example according to the second embodiment will now be described referring to FIGS. 31 through 33.

Figure 31:
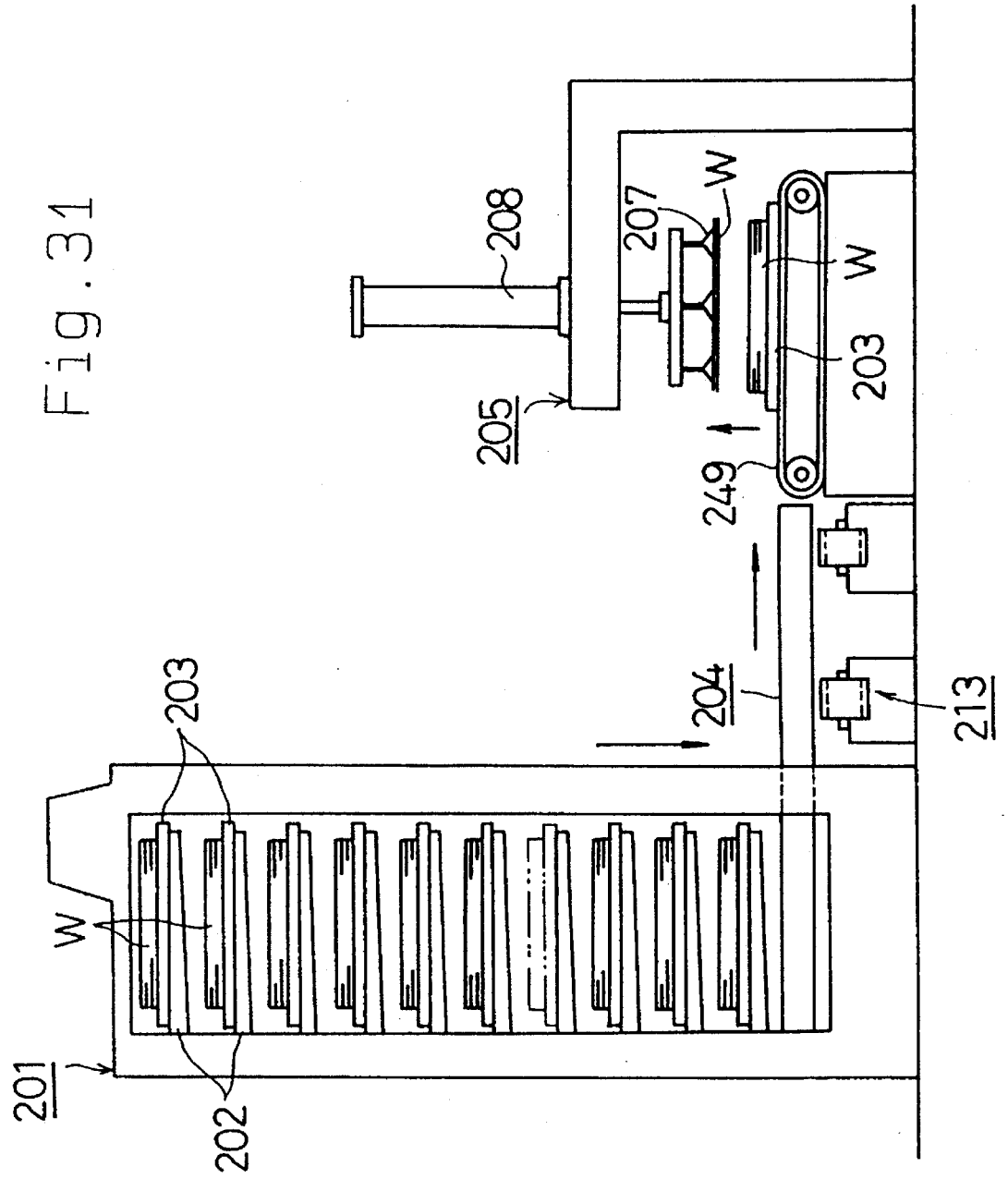
FIGS. 31 and 32 show a side view and a schematic plan view showing a modified example according to the second embodiment.
Figure 32:
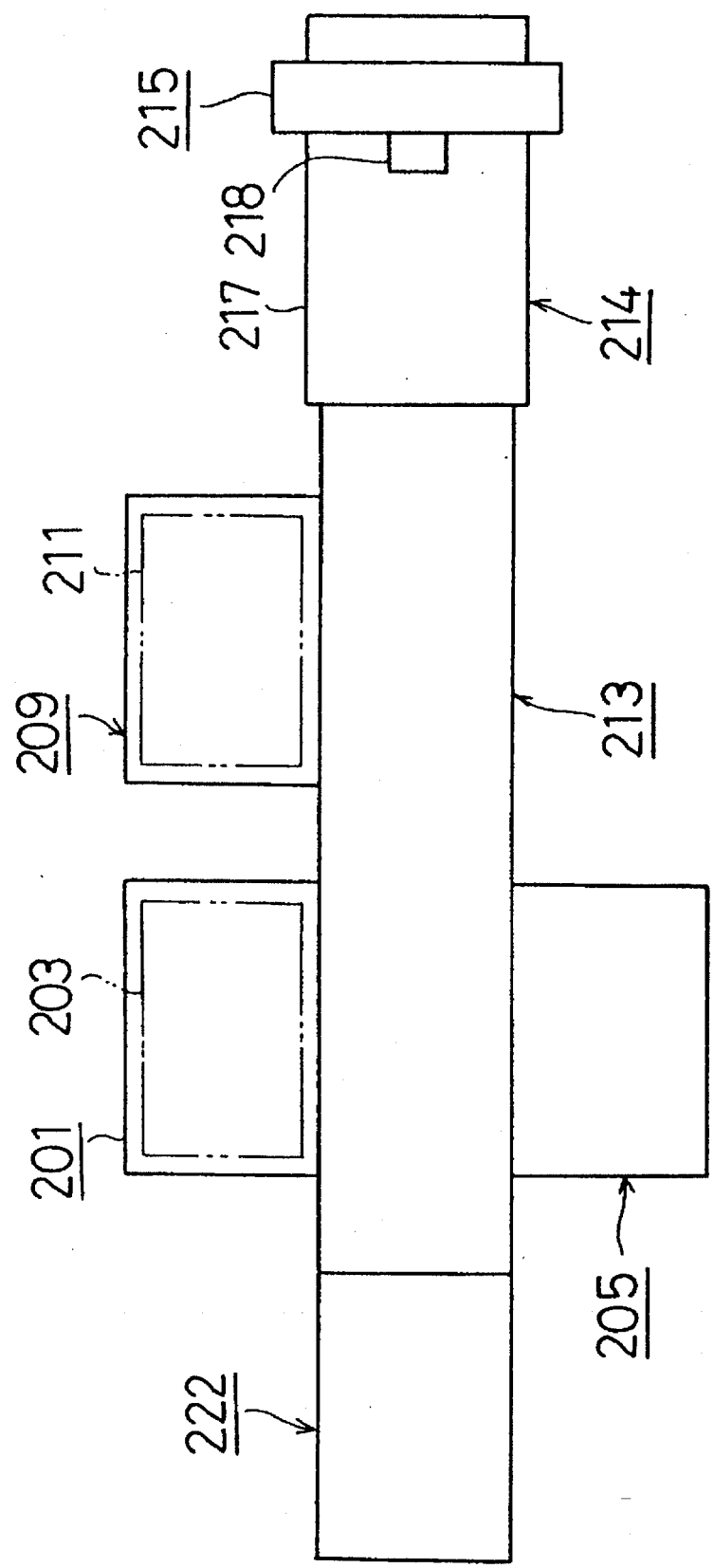
Figure 33:
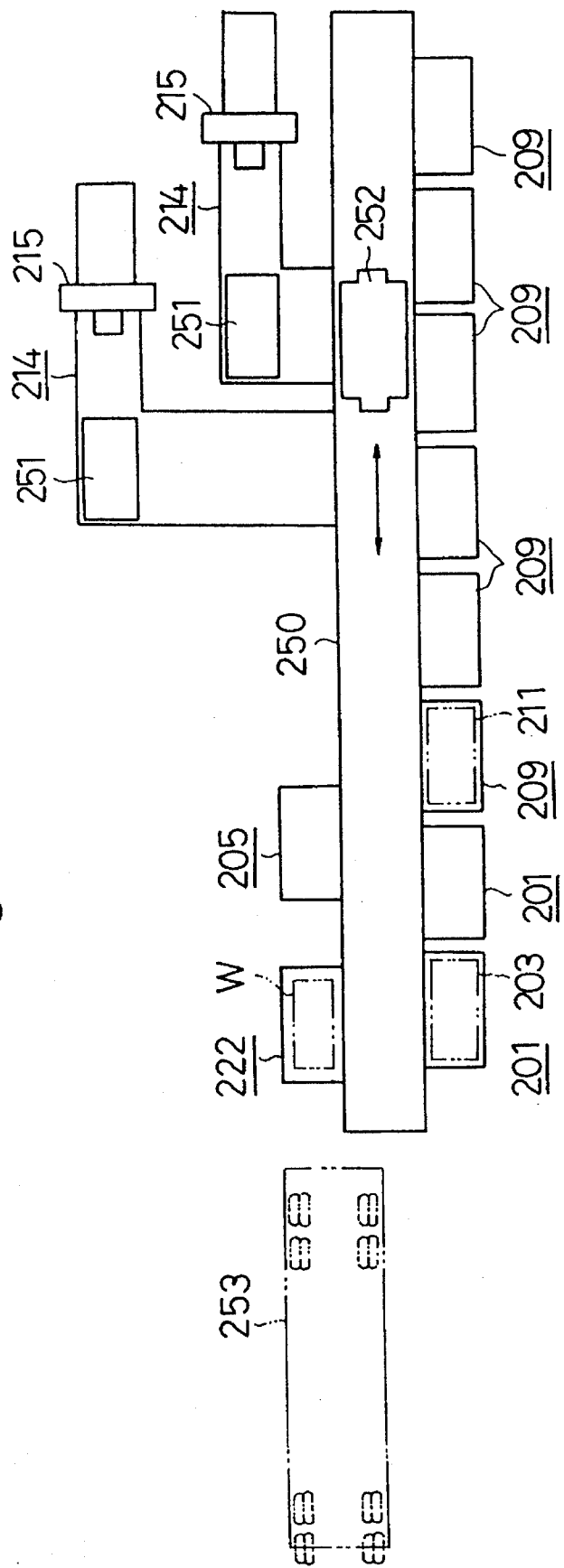
FIG. 33 is a schematic plan view showing another example according to the second embodiment.

As shown in FIGS. 31 and 32, the setting station 205 is located at the other side of the intermediate transport station 300 to face the external front portion of the material stocker 201. The setting station 205 includes a material pallet 203 for supporting a workpiece W, a belt conveyer 249 for transporting a certain work pallet 211, the vacuum adhesion device 207 for picking a sheet workpiece W from the top of the material pallet 203, and the cylinder 208 for vertically moving the vacuum adhesion device 207.

Therefore, according to this embodiment, the pallet 203 supporting a certain workpiece W is drawn out from the material stocker 201 by the pallet transport device 204, and placed onto the belt conveyer 249 within the setting station 205. The sheet workpiece W is picked from the top of the material pallet 203 by means of the vacuum adhesion device 207. After that, while the material pallet 203 supporting the workpiece W is transported away from the setting station 205 with the conveyor 249, a certain work pallet 211 is drawn out from the temporary stocker 209 and transported onto the belt conveyer 249 of the setting station 205 with the combined functions of the pallet transport devices 204 and 212, and belt conveyer 213. Then, the sheet workpiece W is removed from the vacuum adhesion device 207 and placed onto the work pallet 211. This work pallet 211 is transported into either the temporary stocker 209 or the work station 214.

Therefore, according to this example, every time a sheet workpiece W is mounted on the work pallet 211, the material pallet 203 is transported in and out. The location from which the workpiece W is to be picked up and the location of the work pallet on which the picked-up workpiece W is to be set are designed to be different from each other and the vacuum adhesion device 207 is movably controlled between the two locations. Therefore, transporting the material pallet for every workpiece W is no longer required.

Another example according to this embodiment will now be described referring to FIG. 33. According to this example, a transport passage 250 is extended in one direction. A plurality of material stockers 201 and a plurality of temporary stockers 209 are located along the first side of the passage 250. A setting station 222 and setting station 205 are located along the other side portion of the passage 250. A plurality of work stations 214 are located along this side of the transport passage 250. Each work station 214 includes a pallet transport device 251 for transporting in/out a work pallet 211 supporting a workpiece W and a laser beam machine 215. Further, a work robot 252 is movably located on the transport passage 250. The material pallet 203 or the work pallet 211 can be transported between respective stations by means of the work robot.

Therefore, according to this embodiment, when the workpieces W are received at the setting station 222 from a truck 253 by means of a crane, etc., the material pallet 203 is reciprocally transported between the material stocker 201 and the setting station 205 by means of the work robot 252, and then the workpieces W are stored into the shelves of the material stocker 201. When laser beam machining is to be executed by the laser beam machine 215, a sheet workpiece W is transported from the material pallet 203 onto the work pallet 211 by means of the work robot 252 at the setting station 205. After this operation is completed, the work pallet 211 supporting the workpiece W is transported into the work station 214. Laser beam machining is done on the workpiece W by means of the laser beam machine 215. Further, the work pallet 211 supporting the machined workpiece W is transported out from the work station 214 by means of the work robot 252 and stored in a certain temporary stocker 209.

Figure 34:
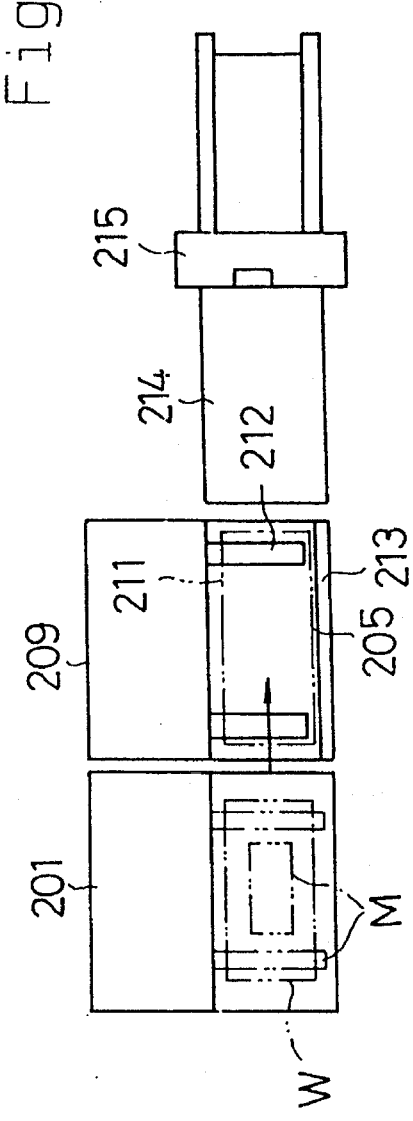
FIGS. 34 through 36 are schematic plan views showing the modification with the alternated positions of each station, respectively.
Figure 36:
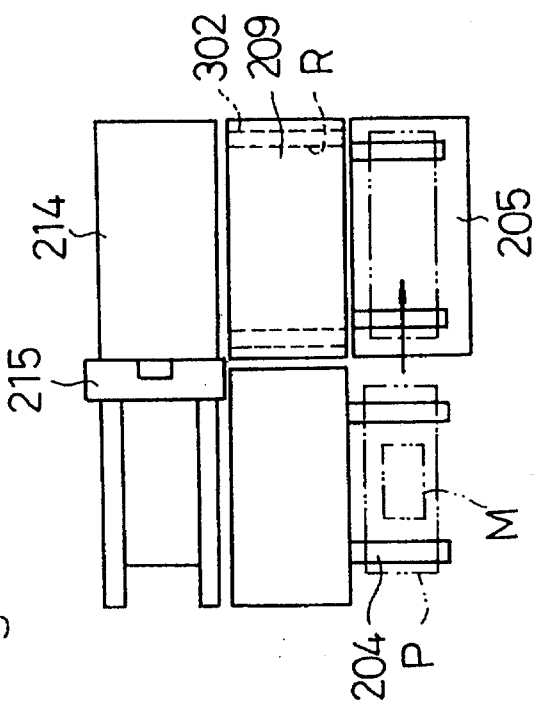
Figure 35:
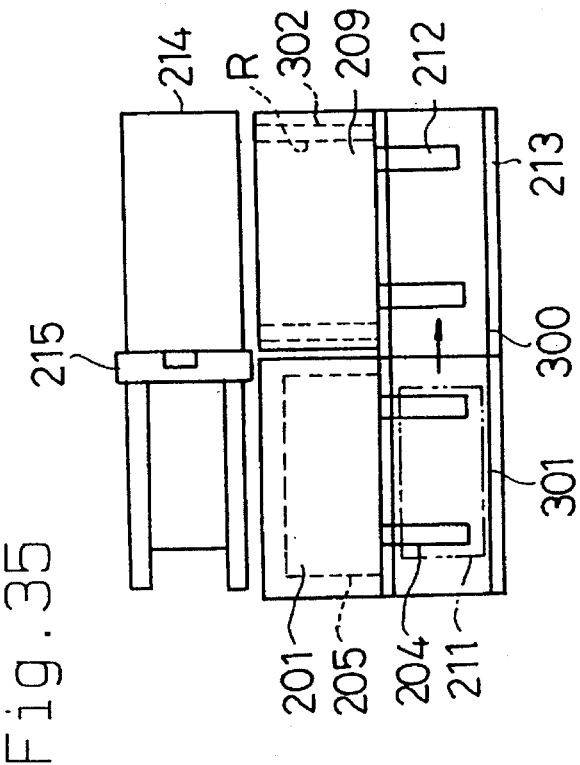

Each one of the FIGS. 34 through 36 shows other examples according to this embodiment. In the example shown in FIG. 34, the temporary stocker 209. The material stocker 201 are located in a row. The setting station 205 is located at the front of the temporary stocker 209, and the material pallet 203 is drawn out from the material stocker 201 by means of the pallet transport device 204 of the material stocker 201. A vacuum transport mechanism M is provided. A sheet workpiece W picked up from the pallet 203 is connected on the work pallet 211, which is transported into the setting station 205. The pallet 211 supporting a workpiece W is transported from the setting station 205 into the temporary stocker 209 by means of the pallet transport device 212. When all pallets 211 supporting the workpiece W are stored in the temporary stocker 209, one of the pallets 211 supporting the workpiece W is drawn out from the temporary stocker 209 into the setting station 205, and then rightwardly transported into the work station 214 by means of the belt conveyer 213. When this structure is employed, the entire structure is simplified, and the cost of designing and manufacturing is reduced. Further, maintenance is significantly simplified. The automation ability of this system is not inferior to that of the other examples.

In the example shown in FIG. 35, the station 205 is located at a bottom space defined within the material stocker 201, where the work pallet 211 placed with the workpiece W is moved from the setting station 205 to the front of the intermediate transport station 301. The pallet P is transported to the intermediate transport station 300 by means of the belt conveyer 213 and stored in the temporary stocker 209 by means of the pallet transport device 212. The work station 214 is located at the other side of the intermediate station 300 near by the temporary stocker 209. The work pallet 211 is drawn out from the temporary stocker 209 onto the intermediate station 300 by means of the pallet transport device 212, and then is transported to work station 214 via a transport passage R formed at the bottom of the temporary stocker 209 by means of a belt conveyer 302.

In the example shown in FIG. 36, the setting station 205 is located at the front of the temporary stocker 209. When the material pallet P is drawn out from the material stocker 201 by means of the pallet transport device 204, a sheet workpiece W is mounted to the work pallet 211 at the setting station 205 by means of the adhesion work transport mechanism M. After machining of the workpiece W is completed, the pallet 211 is stored in the temporary stocker 214 by means of the pallet transport device 212. The work station 214 is located at the opposite side of the intermediate transport station 300 with respect to the temporary stocker 209. The work pallet 211 is drawn out from the temporary stocker 209 to the setting station 205 by means of the pallet transport device 212, and then to the work station 214 via the transport passage R formed at the bottom of the temporary stocker 209 by the belt conveyer 302.

In the structure shown in FIGS. 35 and 36, since each station and stocker are located in a front and rear manner, installation space is more efficiently used as compared to other examples having a structure which the station and stocker are simply located in a row.

The number of stations in the other examples can be varied according to requirements.

In these examples, the process order and to the sequence can be arranged.

In this embodiment, the number and the structure of the material stocker 201, setting station 205, temporary stocker 209 and work station 214 can be altered as desired.

I claim:

1. Laser beam machining apparatus having a stocker for storing a plurality of pallets in a shelved manner, each of said pallets securely carrying a single workpiece thereon, wherein the pallets are transferred to and machined by a laser processing machine one by one, said laser beam machining apparatus comprising:

pallet handling means for selectively drawing a pallet out of the stocker and replacing a pallet into the stocker;

an intermediate transport station disposed between the stocker and a laser processing machine, said intermediate transport station selectively receiving pallets drawn out of the stocker by the pallet handling means and supplying said pallets to the laser processing machine;

transfer means for automatically transferring pallets from the intermediate transport station to the laser processing machine before the workpiece is machined and from the laser processing machine to the intermediate transfer station after the workpiece is machined, wherein the workpiece is kept free from direct contact with the transfer means.

2. The laser beam machining apparatus as set forth in claim 1, wherein said pallet handling means receives a pallet that supports a machined workpiece from the intermediate transfer station to replace the pallet in a predetermined position in the stocker.

3. The laser beam machining apparatus according to claim 1, further including a setting station in the vicinity of said intermediate transfer station for placing or removing a workpiece carried by a pallet.

4. The laser beam machining apparatus according to claim 1, further including a workpiece stocker for pre-storing workpieces to be supplied to an empty pallet at the setting station.

5. The laser beam machining apparatus according to claim 4, further including attaching means for attaching the Workpiece to an empty pallet.

6. Laser beam machining apparatus comprising:

pallet storage means for storing a plurality of pallets and associated workpieces in multiple positions within said pallet storage means;

a laser beam machine for laser beam machining workpieces carried by pallets from the pallet storage means;

first pallet transport means for automatically transporting a pallet between said pallet storage means and the laser beam machine;

an intermediate transport station for transporting a pallet drawn from the pallet storage means via said first pallet transport means to the laser beam machine;

said pallet storage means for storing at least somes pallets supporting machined workpieces returned from the laser beam machine by means of the first pallet transport means to predetermined positions within the pallet storage means; and a setting station disposed in the vicinity of said intermediate transport station for placing or removing workpieces carried by pallets transported from at least one of the pallet storage means and the laser beam machine.

7. A laser beam machining apparatus according to claim 6, further comprising workpiece storing means for storing workpieces to be supplied to an empty pallet.

8. A laser beam machining apparatus according to claim 7, further including attaching means for attaching the workpiece drawn out from said workpiece storing means to an empty pallet.

9. A laser beam machining apparatus according to claim 8, wherein said workpiece storing means stores a plurality of material pallets supporting one or more workpieces in multiple levels and further comprising:

workpiece transfer means for transferring a workpiece from one of the multiple levels to an empty pallet; and a second pallet transport means for transporting a pallet from the workpiece storing means to the attaching means.

10. A laser beam machining device according to claim 6, wherein said first pallet transport means includes a) vertically movable lift driven by lift body driving means and b) horizontally movable drawing body which is driven by drawing means, respectively, and a pallet is vertically transported in accordance with the motion of said lift, and the pallet is horizontally drawn out from the pallet storage means in accordance with the motion of the drawing unit.

11. A method of laser beam machining workpieces with a laser processing machine, said workpieces being individually supported by pallets which are respectively held by shelves in a pallet stocker, said method comprising the steps of:

drawing one of said pallets and a single workpiece securely carried on said one pallet out of the stocker by pallet handling means and carrying the one pallet to an intermediate station;

transferring the pallet from the intermediate station to a laser processing station by a pallet transfer conveyer;

machining the workpiece carried on the pallet with the laser machining machine at the laser processing station;

transferring the pallet from the laser processing station to the intermediate station on the pallet transfer conveyer; and replacing the pallet in a predetermined position in the stocker by the pallet handling means;

where each of said steps is performed while maintaining the workpiece free from direct contact with the pallet transfer conveyer and the pallet handling means.

12. A method of laser beam machining according to claim 11, further including a setting station in the vicinity of said intermediate station and further comprising the step of placing or removing a workpiece carried by the pallet transported from at least one of the pallet stocker and the laser processing station.

13. A method of laser beam machining according to claim 11, further including a workpiece stocker for pre-storing multiple workpieces and further comprising the step of extracting the workpieces from the workpiece stocker and loading the workpieces onto empty pallets prior to storing a combined workpiece and pallet in the pallet stocker.

14. A method of laser beam machining according to claim 13, further including attaching means for attaching the workpiece drawn out from said workpiece stocker to the empty pallet and further comprising the step of automatically Withdrawing each workpiece and placing said workpiece onto an empty pallet.

15. A method of laser beam machining according to claim 11, wherein the pallet stocker comprises multiple levels and the pallet stocker includes a vertically movable lift driven by lift body driving means and a horizontally movable drawing body which is driven by drawing means and wherein a pallet within the pallet stocker is vertically transported in accordance with the motion of said lift, and is horizontally drawn out from the pallet stocker by the drawing means.

* * * * *